INVENTORS
TOM A. WOODARD
EDWARD GORDON
JOHN R. DAVIS

ATTORNEY

Dec. 23, 1969  T. A. WOODARD ET AL  3,486,011
ELECTRONIC ANALOG TRACE COMPUTER

Filed May 20, 1966  5 Sheets-Sheet 3

INVENTORS
TOM A. WOODARD
EDWARD GORDON
JOHN R. DAVIS

BY
Adolph P. Hugin
ATTORNEY

Dec. 23, 1969   T. A. WOODARD ET AL   3,486,011
ELECTRONIC ANALOG TRACE COMPUTER
Filed May 20, 1966   5 Sheets-Sheet 4

INVENTORS
TOM A. WOODARD
EDWARD GORDON
JOHN R. DAVIS
BY
Adolph C. Hugin
ATTORNEY

INVENTORS
TOM A. WOODARD
EDWARD GORDON
JOHN R. DAVIS

BY

*Adolph C. Hauser*
ATTORNEY

United States Patent Office 3,486,011
Patented Dec. 23, 1969

3,486,011
ELECTRONIC ANALOG TRACE COMPUTER
Tom A. Woodard, Fort Worth, Tex., and John R. Davis, Shreveport, La., and Edward Gordon, Claremont, Calif., assignors, by mesne assignments, to UGC Industries, Inc., a corporation of Texas
Filed May 20, 1966, Ser. No. 551,728
Int. Cl. G06f 15/20; G06g 7/48, 7/18
U.S. Cl. 235—151
69 Claims

ABSTRACT OF THE DISCLOSURE

Electronic analog computers for chart traces for computing and visually indicating the time average value and time integral value of chart trace variables for the elapsed time of the trace. A transducer comprising a trace arm is used to follow a trace as it is advanced along its time coordinate such that a voltage is varied according to the magnitude represented by the trace. A voltage also is provided which is representative, by its magnitude, of the rate of chart advance. Electronic analog integrators are connected respectively to integrate the trace variable voltage and the chart time advance voltage. When the desired chart trace has been covered, its advance is stopped. To get a time average of the trace, the trace integrator input is connected to the chart time integrator ouput in a sense tending to discharge the same. A suitable counter is provided to measure the time required for the time integrator to discharge completely the trace integrator, as determined by a zero detector, and this discharge time, properly calibrated, gives the time average of the trace. The time integral of the trace is obtainable by connecting a predetermined fixed voltage to the trace integrator input in a sense tending to discharge the same, and again using the counter to measure the time required for the complete discharge of the trace integrator. This time measurement, properly calibrated, gives the time integral of the trace. Various controls for providing the desired voltages and for calibrating the measuring circuits are provided to enable the measurement of different types of coordinates and charts. The mathematical derivations for the system and the controls and results also are given.

---

This invention relates to chart trace computers and more particularly to an electronic analog trace computer for selectively providing a digital display of the integral of the value represented by the trace and of the average of the trace value for a given period.

Instruments for the measurement and recordation of various quantities, particularly physical values, such as pressure, temperature, specific gravity, etc., are widely used in industry. The value of the quantity often is recorded as a graphic trace formed by an inscribing device, such as a pen, on suitably graduated paper, conventionally comprising a circular or strip chart.

The trace of the quantity or variable is recorded by such a device as a function of the chart motion, which motion normally is representative of time. The motion of such charts may be linear or rotational depending upon whether the chart is respectively of the strip or circular type.

In most instances the quantities which are recorded are subsequently used for performing calculations, and the generally accepted computational form in using such recorded quantities is a time-averaged value, although the integral for the complete trace or for a part of the elapsed time also may be used for certain purposes. It therefore becomes very desirable and convenient to be able to obtain either the time integral of the recorded quantity or the time-averaged value of the variable quantity for a given period of time as recorded on the chart. Various types of mechanical devices have been used for obtaining both a time-averaged value and a time-integral value of such a recorded trace. These mechanical devices often have been subject to various disadvantages resulting from inaccuracies in the mechanism for providing the mechanical average or mechanical integral value.

An object of the present invention is to provide an improved electronic trace value computer.

Another object of the present invention is to provide an improved manually operable chart trace computer.

A further object of the present invention is to provide an improved electronic analog trace integrator and averager.

Yet another object of the present invention is to provide an improved trace integrator and averager providing a visual digital display of the computed results.

Further objects and advantages of this invention will become apparent from the following description referring to the accompanying drawings, and the features of novelty which characterize this invention will be pointed out with particularity in the claims appended to and forming a part of this specification.

In carrying out the present invention the computer is provided with a chart advancing drive, the speed of which is under the direct manual control of the operator, and a transducer, such as a tracing arm, is arranged for readily manually following a trace representative of a quantity on a circular or strip chart which is advanced by the chart advance drive. This tracing arm is correlated to the chart drive so as to provide an electrical characteristic representative of the value being traced, and an electronic analog trace integrator is supplied with this electrical characteristic such that it performs a time integration of the value. Concurrently with this trace integration, another suitable transducer, such as a tachometer generator connected to provide an electrical characteristic representative of the time function of the chart trace supplied to another electronic analog integrator, the time integrator, or a potentiometer connected to be operable in accordance with the chart advance; that is, connected to provide an electrical characteristic, such as a voltage, directly proportional to the advance of the chart, is also operated. Thus, the integral of the value represented by the trace for the time represented by the advance of the chart is measured by the electronic analog trace integrator concurrently with the measurement of the elapsed time represented by the advance of the chart.

Provision is made for measuring and visually indicating the computed time integration of the chart trace variable for the period traced by the tracing arm or of the computed average value of the variable for this period. This computed average value can be conveniently obtained according to a well-known principle of calculus that the average value of a variable is equal to the integral of the variable over a period divided by the length of the period. Since the electronic analog trace integrator provides a measurement of the integral and the electronic analog time integrator or chart advance potentiometer provides a measurement of the length of the period, a division of the trace integrator value by the time integrator or chart advance value provides an average of the trace for the period.

As will be explained in greater detail with reference to the computer circuits illustrated in the drawings, the selection of suitable electronic analog integrators facilitates the mathematical solution for determining the average trace value in that a reconnection of the two integrators such that the time integrator measurement, as indicated by its output, supplied to the input of the trace integrator in a polariy relationship tending to discharge the trace integrator can be used to determine the desired average. The same result is obtainable by the proper reconnection of the trace integrator to the chart advance or time potentiometer where the latter is used as the second or time transducer. The time required for the complete discharge thus brought about is directly proportional to the average of the trace value for the period considered. Accordingly, a suitable counter is provided with a clock for measuring this discharge time, and a suitable interpreting device is provided for visually displaying the measurement made by the counter. The integral of the trace can be determined by similarly simply measuring the time required to discharge the trace integrator by a predetermined fixed voltage. In both cases a suitable calibration of the counter and digital display is provided to assure the accuracy of the result. If desired, the counter measurement can, of course, be recorded as a decimal figure by a suitable conventional recording or printing device or may even be visually displayed by an indicating instrument, such as a galvanometer suitably calibrated for this purpose. Since charts at times measure values which normally vary between limits considerably removed from a decimal zero base, provision can be made on the counter for presetting it to the starting value of the chart on which the trace has been recorded, such that the resultant quantity determined by the counter and visually displayed or recorded will represent the true average or integral of the variable traced by the tracing arm.

Figure 1:
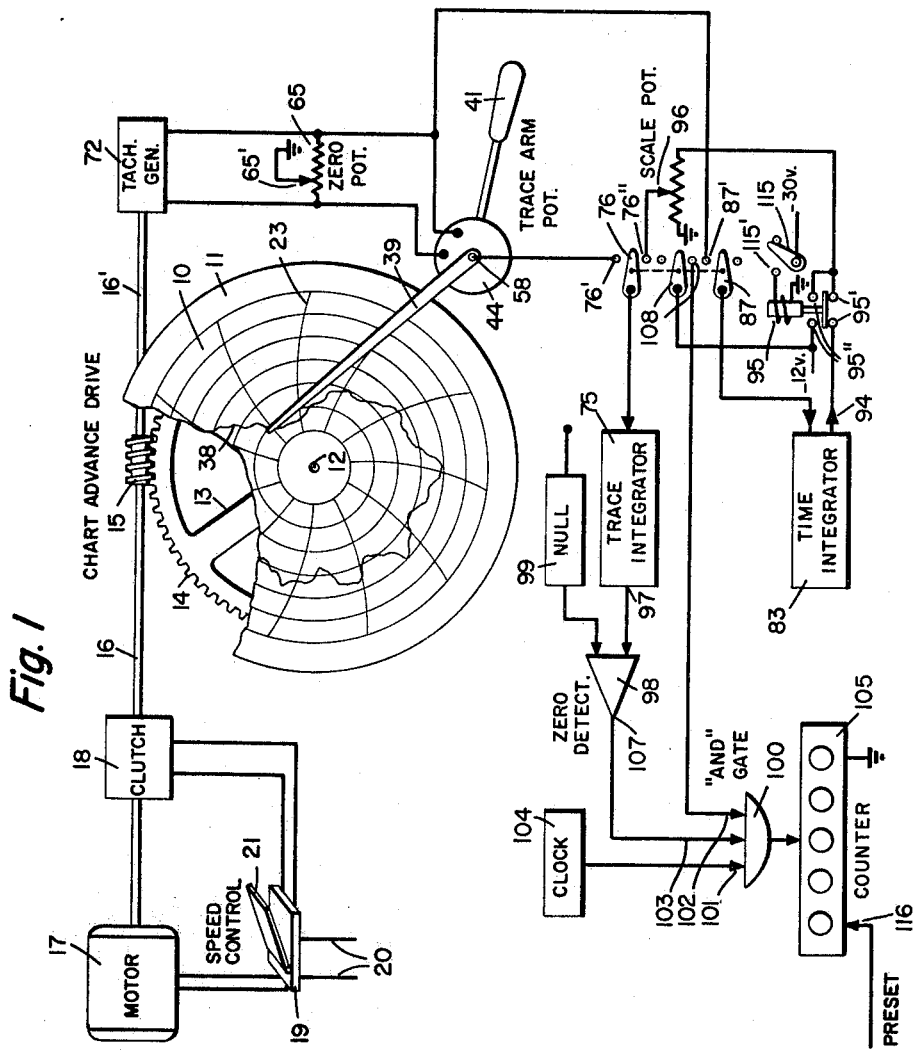
FIG. 1 is a schematic representation of a manually operable electronic analog chart trace computer embodying the present invention and shown as a device for selectively averaging and integrating a trace on a circular type chart.
Figure 2:
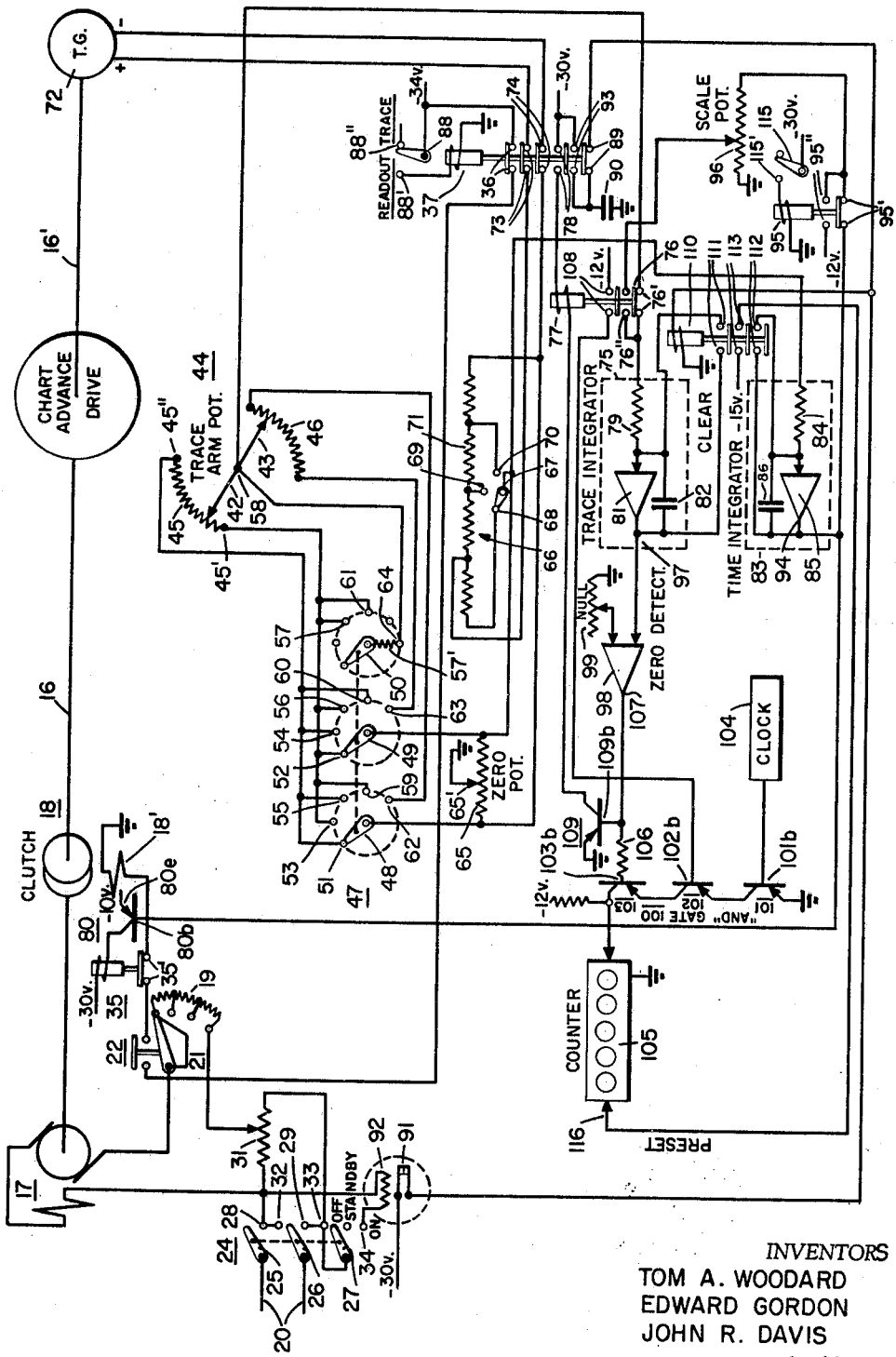
FIG. 2 is a more complete circuit diagram of the basic electrical operating components of the computer shown in FIG. 1.
Figure 3:
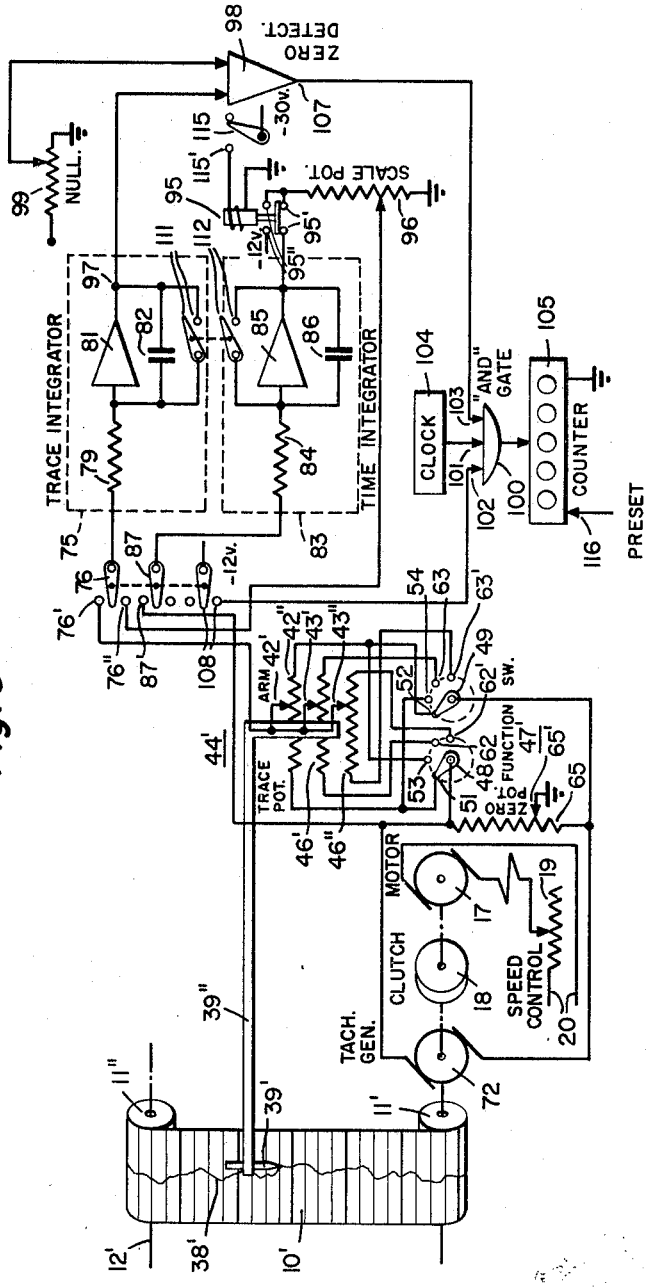
FIG. 3 is a schematic representation of a manually operable electronic analog chart trace computer, similar to those in FIGS. 1 and 2, with suitable modifications for measuring and computing variables represented by traces on a strip type chart.
Figure 4:
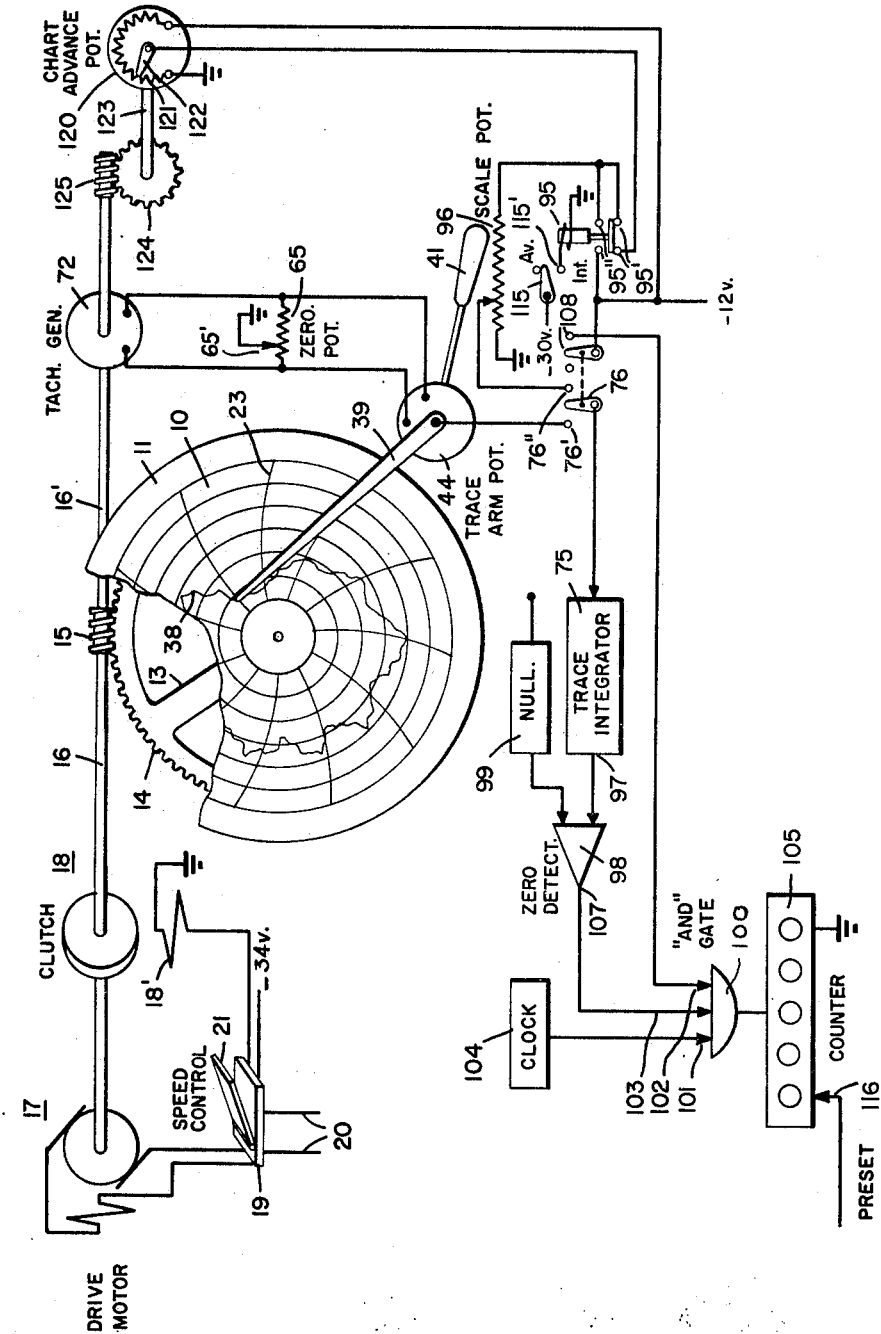
Figure 5:
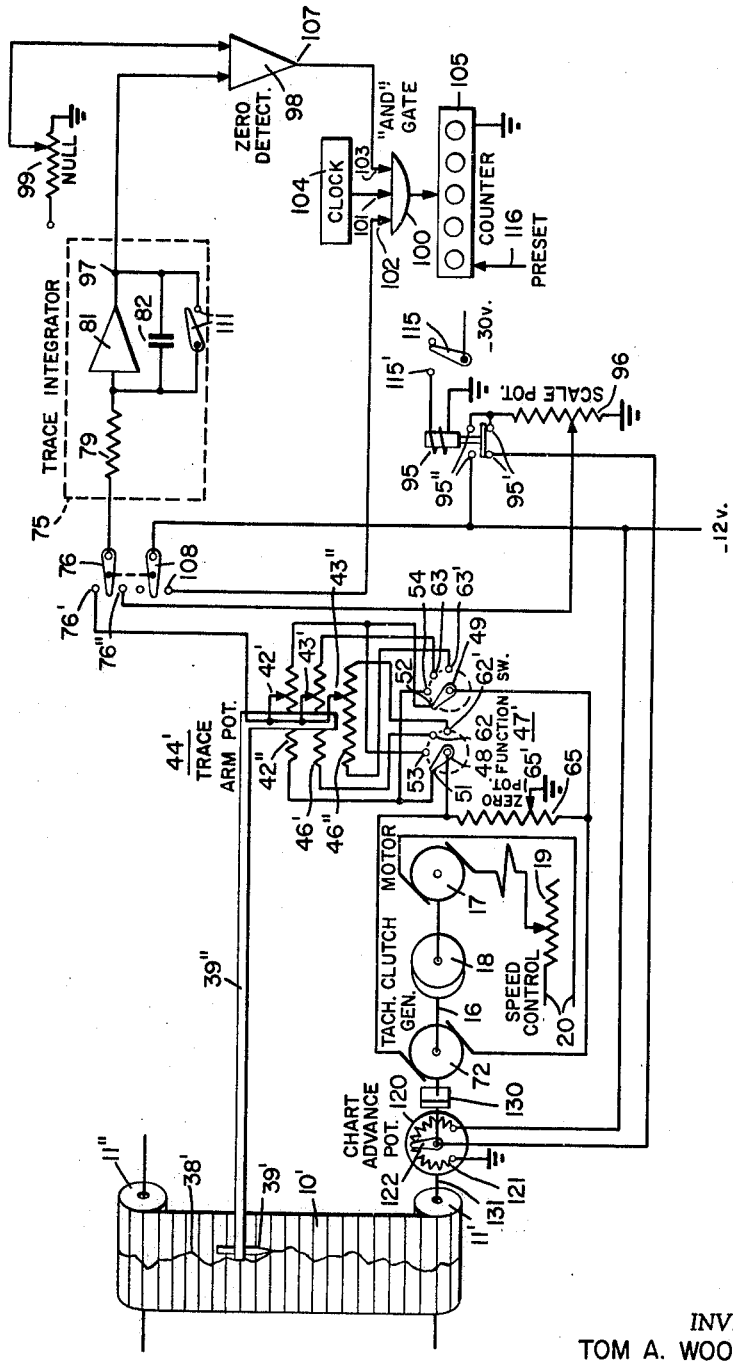

FIG. 4 is a schematic diagram of an analog chart trace value computer according to the present invention, similar to that illustrated in FIGS. 1 and 2, in which the chart time function measurement is made through a suitable potentiometer mechanically and electrically connected as the transducer for this purpose; and FIG. 5 is a schematic diagram of an analog trace value computer embodying the present invention, similar to that shown in FIG. 3, for making determinations from strip charts, and provided with a time potentiometer in place of the time integrator in the same manner as in FIG. 4.

Referring to the drawings, an improved electronic chart trace value computer is illustrated in the FIGS. 1, 2, and 3 embodying the present invention and adapted selectively to provide the integral or the average of a trace value over the period of time represented by the chart trace which is traced or sensed by the computer. The electrical aspects of the systems illustrated in these three figures are substantially the same whether applied to an instrument for computing the value of a trace on a circular chart or on a strip type chart. Corresponding components in all of these figures are similarly numbered and the details shown in these figures are generally interchangeable, except for the chart drive and carrier, the tracing arm, and the chart type selector potentiometer.

CHART ADVANCE DRIVE

The instruments illustrated in FIGS. 1 and 2 are particularly adapted to the making of computations from circular type charts. As is well-known, there are several basic types of circular charts, and the present instrument is provided with adjustments for selectively reading and making computations from any of these standard circular charts.

As shown in FIG. 1, a circular chart 10 of any conventional type is shown supported on a chart advance drive which comprises a chart turntable 11 mounted on a suitable spindle 12 secured to a driving spider 13. The outer periphery of the spider is formed as a gear 14 arranged in driving meshing engagement with a worm 15. The worm is adapted to be driven at a suitable speed under the control of the operator of the computer. This drive is provided through a shaft 16 on which the worm 15 is drivingly mounted and to which power is supplied by a suitable electrical drive motor 17. Power is transmitted from the motor 17 to the shaft 16 through a suitable clutch 18, which, in the present instance, preferably is of the electromagnetic type. In order to facilitate the operation of the instrument, the speed of the chart turntable 11 is conveniently controlled by controlling the speed of the drive motor 17, and this may be efficiently performed by varying the voltage impressed upon the motor 17 by a suitable rheostat, which includes a foot operated variable resistance rheostat 19 conveniently connected between a suitable source of electrical power 20 and the motor 17.

This rheostat 19 may be of any suitable conventional type provided with a foot control pedal 21, so as to allow free use of both of the operator's hands for otherwise controlling the operation of the instrument. The foot pedal speed control rheostat 19 also preferably is provided with a suitable microswitch 22 connected in series with the energizing circuit of the magnetizing coil 18' of the clutch 18. This microswitch is arranged such that the clutch 18 is deenergized and the chart advance drive consequently stopped simply by allowing the speed control rheostat pedal 21 to return to its minimum speed position. This type of chart drive is useful for rotating any conventional type circular chart, and no adjustment of this drive is necessary for any of the conventional type charts.

As previously explained, a circular chart is adapted to be advanced by the chart advance drive including the turntable 11, its driving connection gears 14 and 15, the drive shaft 16, clutch 18, and motor 17; the motor 17 being energized through a speed control including the manually foot operated rheostat 19 connected to a suitable power source 20. Details of the power source may comprise any suitable conventional arrangement for supplying the electrical system of this instrument with the desired voltages, and these do not form part of the present invention, and, therefore, are not illustrated or described in this application.

As shown in FIG. 2, the main power source 20 is adapted to be connected to the driving portion of the electrical system through a main power switch 24. This power switch preferably comprises three contactors 25, 26, and 27, which are simultaneously operable, and all are operable to three positions: an "Off" position, a "Standby" position, and an "On" position. These three positions are indicated by corresponding legends in FIG. 2. In the "Off" position of the three contactors, switch 24 open circuits all parts of the instrument connected to this switch. In the "Standby" position, the contactors 25 and 26 respectively close on contacts 28 and 29, thereby energizing a main speed control potentiometer 31, which conveniently may be operated by a control knob on the control panel of the instrument. The driving motor 17 may be of any suitable type and is shown as a series motor, which is connected across the potentiometer 31 through the foot pedal operated speed control rheostat 19. In this manner the maximum speed at which it is desired to operate the chart may be set by the main potentiometer 31, and the speed of the chart turntable 11 can be controlled from standstill to this maximum speed by the foot operated rheostat 19 and its associated microswitch 22.

When the main power switch 24 is closed to its "Standby" position, the potentiometer 31 is energized, and this results in a minimum energization of the drive motor 17 as long as the foot control pedal 21 is not depressed, since the full resistance of the rheostat 19 remains connected in series with the motor 17, so that it operates at its minimum speed. Furthermore, in this position of the control pedal 21, the microswitch 22 is open, so that the clutch energizing coil 18' is deenergized. As a result, the clutch 18 does not transmit power from the motor 17 to the chart drive shaft 16 with the control pedal 21 in its initial position.

When it is desired to start a computation of a value recorded on a circular chart 10, the main power switch 24 is closed to its "On" position. When this switch is thus closed, the contactors 25, 26, and 27 close circuits with its contacts 32, 33, and 34 respectively. This completes a circuit through the main speed control potentiometer 31 which energizes the motor 17 through the rheostat 19 in the same manner as when the main power switch was closed to its standby position. Power is transmitted from the motor 17 to the chart advance drive by pressing down the foot control pedal 21 of the rheostat 19. This reduces the resistance of the rheostat 19 in series with the motor 17, so that the motor speed increases, and concurrently therewith the microswitch 22 is closed, thereby energizing the electromagnetic clutch coil 18' through the normally closed contacts of an overrun relay 35 and contacts 36 of a readout relay 37. When the clutch 18 is thus energized motive power is transmitted from the motor 17 through the clutch 18 and shaft 16 to the gearing 15 and 14 so as to drive the turnable 11 and advance circular chart 10.

CHART TRACING AND MEASURING

Conventional circular charts usually have suitable arcuate outwardly extending time indicating lines 23 forming the abscissa of the chart. As a rule, these arcuate reference lines are drawn from a center which is spaced from the center of the chart a distance equal to the radius of the arcs. In such charts, these arcs all intersect the center of the chart. Some charts, however, use a different center for the arcuate reference lines, so that the abscissa arcs do not pass through the center of the chart.

All of the ordinates of circular charts are measured along concentric circles which have the center of the chart as the center of these circles; however, these charts may use different types of ordinates characterized by different relative intercircle spacing patterns. The most usual type of ordinates is a series of concentric circles which are spaced apart uniform distance along the arcs forming the abscissas of the chart. This provides the most direct linear type of measurement and recording for such charts. Such ordinates are used for charts in which the abscissa arcs pass through the center of the chart and also where these arcs do not pass through the center of the chart.

Another type of chart is the one on which the ordinate circles are uniformly spaced along a radius of the chart. This has the disadvantage of not providing uniformly divided measurements along the time abscissa arcs. According to the present invention, provision is made for correctly measuring this type of ordinate, as well as ordinates which are uniformly divided on the obscissa arcs. This uniformly divided radius ordinate type of chart is to be found in charts wherein the abscissa arcs pass through the center of the chart, and also on those wherein the abscissa arcs do not pass through the center of a chart. All four of these types of charts are adapted to record linear measurements of quantities along the ordinates of the charts.

Another fairly common type of chart is one on which the ordinates are represented by concentric circles spaced along abscissa arcs in accordance with the square root function of the quantities, with the values increasing from the center of the chart toward the outer edge thereof. As in the other four types of charts, the abscissa time arcs may or may not pass through the center of the chart.

In all six of these types of charts the recording on the chart may be made by a pen, which swings outwardly in a clockwise direction for increasing values or may record on the opposite side of the chart by swinging outwardly in a counterclockwise direction for increasing values. The linear value measurement chart recordings conventionally may be found as either clockwise or counterclockwise recordings, and, therefore, the present invention contemplates the measurement and utilization of either of these types of recordings. As a rule square root function charts are recorded in a clockwise pen swing direction for increasing values, and, therefore, the illustrated embodiments of the present invention adapted to be used with circular charts are shown only for use with this type of square root function charts.

In order to read or trace a circular chart 10, it normally is rotated at a relatively low speed so as to enable the operator to follow a trace 38 with a pointer on the outer end of a chart trace arm 39. If the trace 38 is fairly regular, the operator can increase the speed of advance of the chart simply by depressing further the foot pedal 21, so as to shunt out more of the resistance of the speed control rheostat 19. Conversely, if a trace is fairly irregular or has relatively rapid changes, the speed of advance of the chart can be reduced by inserting more of the resistance of the rheostat 19 in series with the motor 17, or even reduce the voltage by changing the setting of the potentiometer 31, thereby reducing the motor speed and consequently reducing the speed of advance of the chart and providing for more readily following the trace irregularities.

The trace arm can be operated in any suitable manner, and, in the system shown in FIG. 1, a suitable manually operable handle 41 is provided for this purpose. The trace arm 39 forms part of a transducer which is adapted to change the mechanical movement of the trace arm 39 into a corresponding electrical characteristic. In the arrangement illustrated in FIGS. 1 and 2, the trace arm 39 is mechanically coupled to the wipers or contactors 42 and 43 of a trace arm potentiometer 44, such that the wipers 42 and 43 move over the resistances of the potentiometer in accordance with the movements of the trace arm 39. As previously stated, the present instrument is adapted to make computations from circular charts which have linear and nonlinear ordinates, as well as from charts having ordinates graduated according to a square root function. This is conveniently made possible by the construction of the trace arm potentiometer 44 in which the potentiometer is provided with a linearly variable resistance 45 which is adapted to be contacted and varied by the wiper 42 and the provision of a square root function variable resistor 46 which is adapted to be varied by the wiper 43 which contacts this latter resistance.

Also as previously stated, the present instrument is adapted to make computations from circular charts on which the trace was inscribed by a pen moving in either a clockwise or a counterclockwise direction outwardly from the center of the chart. FIG. 1 illustrates the trace arm 39 in position for following a trace inscribed by a clockwise movable inscribing pen. The trace arm 39 simply would be located on the diametrically opposite side of the turntable spindle 12 if the chart were one with which the inscribing pen had had a counterclockwise movement for increasing ordinate values on the chart. Charts for use with the latter type inscribing pen are printed with abscissa arcs 23 curved in the reverse direction from those illustrated in FIG. 1.

Since the trace arm 39 must move in opposite directions for increasing values of ordinates on clockwise and counterclockwise-drawn charts, it is necessary to provide means for reversing the increasing and decreasing potentiometer resistances for these two types of charts. Likewise provision must be made for the utilization of only one of the variable resistances 45 and 46 of the trace arm potentiometer 44 in accordance with whether the chart ordinates vary linearly or as a square root function. Furthermore, the present computer can be used in connection with circular charts having linearly or nonlinearly variable ordinates, in which the linearly variable ordinates are measured along uniformly divided arcs 23, as well as with non-linearly variable ordinates which are uniformly divided along the radii of the charts. In order to facilitate the ready choice of the proper electrical characteristic to be supplied by the transducer incorporating the trace arm potentiometer 44, a simple three wafer function selector switch 47 is provided.

This three wafer function switch 47 includes three contactors 48, 49, and 50, which are constructed so as to be simultaneously operable, each contactor being adapted respectively selectively to engage one of a plurality of contacts on one of the three wafers of the switch. The function switch 47, as shown in FIG. 2, is a five-position switch; that is, each of the three wafers of this function switch is provided with five similarly positioned contacts, with corresponding position contacts on each wafer concurrently engageable by its respective contactor. These contacts of the function switch 47 can be connected in any suitable manner to provide the desired electrical output characteristic of the trace arm potentiometer 44 in accordance with the type of chart for which a computation is to be made. In the illustrated arrangement, the successive contacts on all three of the switch wafers, beginning from the position in which the contactors are shown in FIG. 2 and progressing in a clockwise direction therefrom, are adapted respectively to connect the trace arm potentiometer variable resistances for computations to be made on charts having the following types of ordinates:

(a) The first and illustrated position contacts 51 and 52 provide for utilization of the linearly variable resistance 45 for a clockwisely inscribed chart with uniformly divided arc ordinates;

(b) The second position contacts 53 and 54 provide for use of the linearly variable resistance 45 in connection with a counterclockwisely inscribed chart having uniformly divided arc ordinates;

(c) The third position contacts 55 and 56 provide for utilization of the linearly variable resistance 45 in connection with a clockwisely inscribed chart having uniformly divided radius ordinates, in which position contactor 50 engages contact 57 so as to connect a compensating resistance 57' in parallel with the linearly variable resistance 45 between the terminal 45' of this resistance and the trace arm potentiometer common wiper terminal 58;

(d) The fourth position contacts 59 and 60 provide for utilization of the linearly variable resistance 45 in connection with counterclockwisely inscribed traces having uniformly divided radius ordinates, with the contactor 50 in engagement with contact 61, so as again to insert the resistance 57' in parallel with the part of the linearly variable resistance 45 between its terminal 45' and the common wiper terminal 58; and (e) The fifth position contacts 62 and 63 provide for utilization of the square root function resistance 46.

A sixth position for the wafer switch 47 may be provided and is indicated by the contact terminal 64. This would be the "Off" position of the function switch. In this position all parts of the trace arm potentiometer 44 are functionally disconnected from the system.

Details of the trace arm potentiometer and of the function switch which are necessary for the proper operation of an instrument built in accordance with this invention, but which may be varied in accordance with other electrical characteristics of the instrument, include the type of resistors 45 and 46 which form the electrical characteristics determining parts of the trace arm potentiometer and the switch resistor 57. The resistance of 45 is a linear type resistor; that is, it comprises a suitable resistance member the electrical resistance of which varies directly with the linear displacement of the wiper 42 as it contacts the successive parts of the resistor. Such resistance members are readily available and may be purchased on the open market, so that any good conventional resistance member may be used which conforms to the general electrical constants of the remainder of the system. As previously explained, charts having ordinates which uniformly divide the arc along which an inscribing pen operates inherently correspond to uniform linear measurements and, therefore, inherently can be read directly by the simple movement of the wiper 42 in contact with the linear resistor 45 as the trace arm 39 follows a trace. The main condition which must be predetermined in reading or tracing such a chart is whether or not the chart was drawn with a clockwise or counterclockwise moving pen, so that the function switch 47 can properly be placed to read the chart which is to be traced.

Since the follower on the trace arm 39 in the embodiment illustrated in FIGS. 1 and 2 is only movable along arcs having a center corresponding to the center of the wipers 42 and 43 of the trace arm potentiometer, it is not possible to obtain displacement of the trace arm corresponding to uniform radius ordinates. As a result, a nonlinear function must be measured by the arcuately linearly movable follower on the end of the trace arm 39. It has been found that this can conveniently be done simply by inserting a suitable resistance 57' in parallel with the part of the trace arm potentiometer resistor 45 which determines the quantity under measurement. The value of the parallel resistance 57' can be determined experimentally by taking readings on a chart with the desired characteristics at different ordinate values. The value of the resistance 57' can be predetermined within a fair range when the other constants of the system are known, so that in the manufacture of this type of instrument only a relatively small adjustment needs to be made for each instrument as it is built. Once this value has been adjusted, it is fixed, and no further changes are needed for any given instrument.

The square root function resistor 46 of the trace arm potentiometer may be any conventional resistor having a resistance which varies linearly in accordance with a square root function; that is, varies directly as a square root function of the displacement of the wiper 43 as it is moved in contact with the resistor 46 by the trace arm 39 as it follows a trace. Since most circular charts using square root function ordinates are inscribed with the square root function increasing in value with outward clockwise movement of the pen, only a clockwise square root function resistor 46 is provided. If it were desired to measure counterclockwise square root function charts, another square root function resistor and wiper could be added to the trace arm potentiometer with values increasing in the opposite direction and contacts could be added to the function switch 47 to provide for the tracing of such charts by switching to the use of such a resistor.

In some instances, it will be found that the measurement of a value as indicated by the position of the potentiometer trace arm when in its zero position, actually does not indicate zero on the instrument. This can be readily corrected by the provision of a zero potentiometer 65 which is connected in shunt across the input terminals to the trace arm potentiometer. By simply adjusting the position of the zero potentiometer wiper 65' which is connected to ground, the zero or ground reference of the trace arm potentiometer can be adjusted as desired. This zero potentiometer provides a fixed reference voltage point or value which is at ground potential as the zero for the trace arm potentiometer output voltage.

In order to increase the versatility and accuracy of an instrument incorporating the present invention so that it can be used to make accurate computations from various traces which may extend over an entire chart; that is, from zero to substantially the complete revolution of a circular chart, as well as from traces which may extend to only for about one-half of a revolution, and even from traces which may have abscissas extending only over a small fraction of a chart, approximating as little as ten percent of the chart, a refinement of the trace arm potentiometer measurement is obtainable by the provision of an abscissa or time measurement response varying device. This abscissa or time measurement response varying device conveniently may comprise a three-position switch 66, which is adapted to place varying amount of resistance in parallel with the trace arm potentiometer 44. Details of this device are shown in FIG. 2, wherein the switch 66 is provided with a contactor 67 connected directly to one side of the trace arm potentiometer 44 through the function switch 47 and is adapted selectively to engage, in its three positions, the switch contacts 68, 69, and 70, successively connected to different points along a fixed resistor 71. One end of the resistor 71 is connected to the contact 68 and the other end of the resistor 71 is connected directly to the opposite side of the trace arm potentiometer from that to which the switch contactor 67 is connected. As in the case of the contactor 67, the terminal of the resistor 71 connected to the trace arm potentiometer is connected thereto through the function switch 47. As can more readily be seen from a consideration of FIG. 2, when the contactor 67 engages contact 68, the complete resistance 71 is connected in parallel with the trace arm potentiometer, and, in accordance with the simple rule for determining the resultant resistance of resistances in parallel, this provides for a relatively larger effect on the resultant resistance for any given displacement of the trace arm potentiometer then would be obtainable with a relatively smaller resistance connected in parallel with the trace arm potentiometer. Thus, for any given trace arm displacement the maximum effect or change can be produced with this position of the contactor 67, so that it should be used when measuring traces extending over only a relatively small fraction of a chart.

In the second position of the contactor 67, in which it engages contact 69, only about half of the resistance 71 is in parallel with the trace arm potentiometer. This, therefore, greatly reduces the relative effectiveness or change in the resultant resistance of these two resistors in parallel for any given displacement of the trace arm, so that a relatively smaller net effect on the resultant resistance of the potentiometer is produced for any given trace arm displacement. This, therefore, conveniently can be used when making measurements on traces which extend over a greater part of the chart but only cover approximately one-half to two-thirds of a chart.

When it is desired to read a chart on which the trace extends over a substantially complete revolution or even slightly more than one complete revolution, the contactor 67 is placed in engagement with the third contact 70 of the switch 66, so that only a very small part of the resistor 71 is connected in parallel across the trace arm potentiometer. Since this relatively small resistance is in parallel with the trace arm potentiometer resistance, the relative effectiveness of displacements of the trace arm are at their minimum; that is, are greatly reduced from their effectiveness with the switch 66 in either of its other two positions. This enables the reading or measurement to be made from traces extending substantially over a complete chart. Thus the abscissa or time measurement response varying device makes it possible to obtain accurate determinations from charts having traces thereon extending over different periods of time as represented by the fraction or part of the chart over which the trace extends.

Traces on circular charts are drawn by a variety of instruments and, even when drawn with instruments of the same type, often are drawn with pens having different lengths of tracing or pen arms. For any given chart the pen arm radius corresponds to the radius on which the time or abscissa arcs are drawn on the chart. Also the center of the pen arm is located on the inscribing instrument at the point which corresponds to the center on which the time or abscissa arcs are drawn. The location of this center for the time or abscissa arcs, as well as the length of the inscribing pen arm radius, vary considerably in different instruments. In order to obtain an accurate computation from an instrument incorporating the present invention, it is necessary, therefore, that the tracing arm 39 be adjustable in length so that it can be made equal to the length of the inscribing pen arm which was used in recording the trace to be measured. This can be readily accomplished simply by using a type of telescopic adjustment of the length of the trace arm 39 or by any similar length adjusting arrangement. Various mechanical structures can be provided for producing this desired result and details of the length adjusting feature do not form part of the present invention.

In addition, it is necessary that the point about which the trace arm 39 is rotatable be adjustable so that it can be made to correspond in position relative to the center of a chart to the point which formed the center on which the time or abscissa arcs of a chart were drawn. This simply requires the provision of an arrangement facilitating the adjustment or movement of the trace arm potentiometer relative to the spindle 12 of the turntable 11. Various suitable adjustable mounting means can be provided for thus changing or adjusting the center of the trace arm potentiometer relative to the turntable spindle 12, and details of such mountings do not form part of the present invention and consequently are not illustrated or described.

Summarizing the features of the embodiment of the present invention illustrated in FIGS. 1 and 2, which provide for the measurement of values represented by a trace on a circular chart, the information which is to be processed by the instrument is conveyed to the computing parts of the instrument from the chart by manually following a recorded trace 38 on a circular chart 10 by a follower or pointer mounted on the end of a trace arm 39. This trace arm is moved by an operator through the manipulation of a handle 41 in following the trace 38 so that the follower is kept as close as possible to the center of the recorded trace while the chart 10 is rotated. The rotation of the chart 10 is produced by driving the turntable 11 by the motor 17 at a speed which is controlled by the operator through the speed control foot pedal rheostat 19. The motive power is transmitted from the motor 17 to the drive shaft 16 through the electromagnetic clutch 18 whenever the speed control foot pedal 21 is depressed. The power is transmitted from the drive shaft 16 to the chart turntable 11 by a worm 15 arranged in mechanical driving engagement with the turntable gear 14. This provides a very flexible control of the operating speed of the chart 10 at the discretion of the operator which greatly simplifies the task of following the trace, especially if it has a rapidly varying slope or curvature. The position of the follower and consequently of the trace arm 39 represents the quantity which is being measured. The output of the measuring features of this instrument represents the variable ordinate of the information or quantity being measured, and the direct mechanical coupling of the potentiometer 44 to the trace arm 39 provides a very convenient direct translation of the mechanical movement of the trace arm 39 into an electrical characteristic which can be utilized in determining the value represented by the trace 38. Thus, the measurement and translation of the value represented by the trace 38 can be accurately and readily made by the feature thus far described.

In order to utilize the electrical characteristic obtainable from the trace arm potentiometer 44 to determine the value represented by the trace, the electrical output characteristic of the trace arm potentiometer, which is a voltage, is suitably integrated for the advance or time abscissa of the chart during which the trace has been followed by the trace arm. In order to obtain an accurate measurement of the advance or time abscissa of the chart under consideration, a tachometer generator 72 is mechanically coupled for a direct drive by the drive shaft 16 through any suitable means such as an extension 16' of the drive shaft, so that the tachometer generator rotates at a speed directly proportional to the speed of the chart turntable 11. As a result the output voltage of the tachometer generator 72 is directly proportional to the speed of advance of the chart turntable 11, and it is, therefore, a chart speed responsive voltage. The output of the tachometer generator is connected across the trace arm potentiometer 44 through the function switch 47 and its relative magnitude is controlled as previously described by the three-position switch 66 in accordance with the proportion of a complete chart which is represented by the trace 38 undergoing measurement. This connection of the tachometer generator output to the trace arm potentiometer is conveniently controlled by the readout delay 37, which is provided with two sets of contacts 73 and 74 which completes this connection when the relay 37 in its deenergized position, as shown in FIG. 2.

The foregoing operative relations provide for an easy measurement of the quantities to be determined as can be shown by a simple consideration of the physical factors involved. If the angle of advance or rotation of the chart is represented by the angle $\theta$, the tachometer generator output voltage will be proportional to the change in the angle of advance $(d\theta)$ divided by the operational time $(dt)$ for the advance; that is, it may be represented by the fraction $$K_1 \frac{d\theta}{dt} \cdot K_1$$

is a proportionally constant determined by various circuit parameters.

The change in the angle of advance $(d\theta)$ is representative of and, therefore, proportional to the change in time as recorded $(dr)$. The constant of proportionality is directly dependent upon the time scale $(K_c)$ of the chart, and the relationship may be written, $d\theta = K_c dr$. Thus the output voltage of the tachometer generator can be expressed as $$K_1 K_c \frac{dr}{dt}$$

After attenuation by the three-position switch 66, the voltage impressed on the trace arm potentiometer 44 and the time integrator 83 is $$K_1 K_a K_c \frac{dr}{dt}$$

where $K_a$ is the attenuation factor resulting from the position of the three-position switch. This $K_a$ will have one of three values, $K_{a1}$, $K_{a2}$, or $K_{a3}$, depending upon the position of switch 66, since it introduces a different attenuation or proportionality factor in accordance with each of its three positions.

The electrical characteristic which is represented by the output voltage of the trace arm potentiometer is adapted to be measured between the trace arm potentiometer wiper terminal 58 and ground. This voltage is the three-position switch output voltage as modified by the trace arm potentiometer. It can therefore be expressed as $$K_2 P \frac{dr}{dt}$$

where $K_2$ equals the product $K_1 K_a K_c$ and P represents the resistance of the potentiometer corresponding to the position of the trace arm 39 as measured from its zero setting, and therefore is representative of the instantaneous value of the chart variable which is being traced on the chart, while $K_2$ represents a proportionality constant determined by circuit parameters of the trace arm potentiometer and associated trace reading circuits. These two voltages therefore provide instantaneous measurements which can be utilized to obtain the integral of the trace for a given recorded period of time or a recorded time-averaged value of the trace quantity.

COMPUTING TIME-AVERAGES AND INTEGRALS FOR CIRCULAR CHARTS

In order to utilize the measured instantaneous output voltages for obtaining the desired computations, they are adapted to be impressed upon any suitable electronic trace variable integrator 75 through closure of contactor 76 on contact 76', FIG. 1, which is closed during the tracing or measuring function of the instrument. In the simplified logic diagram of FIG. 1, these switching elements, are shown as part of a manually operable switch; while in the amplified circuit diagram of FIG. 2, they are part of an integrator input control relay 77. As shown in this latter figure, the coil of the relay 77 is deenergized by being open-circuited through contacts 78 of the readout relay 37, and the circuit from the trace arm potentiometer to the integrator is consequently closed by the contactor 76 through the contacts 76' during the tracing or measuring function of the instrument.

The electronic trace integrator 75 may be of any suitable type, and preferably is of the high gain D.C. amplifier type, such as that described in "Electronic Analog Computers," 2d ed. (1956) Korn and Korn, McGraw-Hill Book Company, Inc., pages 8–26 and 171–189. This type of electronic integrator comprises three main units as shown in FIG. 2, and includes an input resistor 79, a high gain D.C. amplifier 81 connected in series with the input resistor 79, and a capacitor 82 connected across the terminals of the amplifier 81. This type of electronic integrator provides a voltage at the output terminal of the integrator which is directly proportional to the time integration of the input voltage thereof. The input voltage to the integrator 75 is the tachometer generator voltage as modified by the trace arm potentiometer circuitry, i.e.

$$K_2 P \frac{dr}{dt}$$

as previously explained. Thus, the input voltage to the integrator 75 is directly proportional to the instantaneous value of the chart variable. The integrator 75 integrates this voltage with respect to operational time and yields at its output a voltage proportional to this integral; that is, a voltage equal to $$K_3 \int_{t_1}^{t_2} P \frac{dr}{dt} dt$$

where $K_3 = K_2 A_1$ in which $A_1$ is the gain factor of the integrator 75. This voltage is, therefore, directly proportional to the integral of the variable traced by the trace arm 39 over the recorded period represented by the advance of the chart for the operational time during which the measurement was made.

In order to determine the average value of a variable represented by a graph, the present computer utilizes a well-known principle of calculus that the average value of a variable is equal to the integral of the variable over a period divided by the period. This may be represented by the equation:

(1) $$K_s P (\text{average}) = \frac{1}{r_2 - r_1} \int_{r_1}^{r_2} K_s P \, dr$$

In this equation, as previously used, P is proportional to the variable quantity represented by the trace, and $r_2 - r_1$ is the recorded period over which the integral is to be taken. $K_s$ is the chart ordinate factor of the chart being considered. This latter quantity, $r_2 - r_1$, in a circular type chart is represented by the abscissas and graphically is proportional to the angle through which a chart is rotated on the computer while the trace is being measured. Using previously explained definitions, the tachometer 72 voltage (2) 
$$V_{72} = K_1 \frac{d\theta}{dt}$$

(3) 
$$\theta = K_c r$$

(4) differentiating (3)

$$d\theta = K_c dr$$

(5) from (2) and (4)

$$V_{72} dt = K_1 d\theta = K_1 K_c dr$$

(6) integrating (5)

$$\int_{t_1}^{t_2} V_{72} dt = K_1 K_c \int_{r_1}^{r_2} dr = K_1 K_c (r_2 - r_1)$$

Then the integral of the tachometer voltage $V_{72}$ for the operating time $(t_2-t_1)$ is directly proportional to the angle through which the chart is rotated, representative of the measurement of recorded time $(r_2-r_1)$. It remains, therefore, simply to obtain this integral in order to determine the average of the variable represented by the trace on the chart undergoing measurement.

In the computer shown in FIGS. 1 and 2, the integral of the period during which a trace has been measured can very conveniently be obtained by integrating the voltage output of the tachometer generator 72. Any suitable integrator can be used to obtain this result, and a high gain D.C. amplifier type integrator 83, similar to the trace integrator 75, may be used. This integrator 83 functions as a time or period integrator and comprises a main input resistor 84 connected in series with a high gain D.C. amplifier 85, across which a capacitor 86 is connected. The input to the resistor 84 is adapted to be connected to the tachometer generator 72, so that its input voltage will be directly proportional to the tachometer generator voltage in FIG. 1. This connection is shown as being made directly through a manually operable switch contactor 87 and contact 87' which are adapted to be closed simultaneously with the closing of the switch contactor 76 on its contacts for energization of the trace integrator 75.

In the more detailed diagram shown in FIG. 2, it is seen that the connection of the input resistor 84 to the tachometer generator is made through the three-position selector switch 66 and the contacts of the relay 37 associated with the switch 66. In this instance, these contacts are the contacts 73 and 74 which are closed as shown in FIG. 2 when the relay 37 is deenergized, as it is during the tracing or measuring cycle of the computer. The reason for this connection of the time integrator 83 through the selector switch 66 is in order to have the integral of the time or period of a magnetic corresponding to the magnitude of the integral of the variable, so that these will always bear the same proportional relationship. The purpose and operation of the selector switch 66 have been previously described. Briefly this switch provides for a greater degree of accuracy for different measurements made by the computer.

Since the selector switch 66 impresses three voltage steps or graded values on the circuits connected to be energized therethrough, the period required for the time integrator output voltage to reach a predetermined value will depend upon the voltage step impressed upon its input by the position of the selector switch 66. Generally, the operator of the computer will manually control its operation and will stop the trace or measurement cycle by release of the rheostat foot pedal 21; however, should he fail thus to stop the operation, advantage can be taken of the time integrator output reaching a predetermined value automatically to stop this cycle of operation. This preferably is made to occur at a value sufficient to assure completion of the cycle, such as a value normally allowing about a ten percent overrun. The use of the selector switch 66, as previously explained, provides for a convenient mode of automatic control of the trace or measurement cycle of the computer by stopping this cycle when the output of the time integrator 83 reaches a predetermined value equivalent to this ten percent overrun.

Conveniently this is obtained by connecting the coil of the overrun relay 35 through an energizing circuit including an NPN transistor 80, and connecting its emitter 80e to a voltage sufficiently above the rated complete trace or measurement period output potential of the time integrator to provide the desired overrun percentage. In the FIG. 2 circuit, this is provided by connecting the emitter 80e to −10 volts and the side of the overrun coil away from the transistor 80 to −30 volts. Thus, it is necessary that the transistor base 80b be biased to more than −10 volts in order to make the transistor 80 conductive to energize the coil of the overrun relay 35. This base 80b is connected to the output of the time integrator 83; and, consequently, when this output voltage reaches a predetermined value higher than the −10 volts emitter reference voltage, much as −10.5 volts, the transistor 80 will conduct. This in turn energizes the coil of the overrun relay 35, which opens the circuit through its contacts 35', thereby deenergizing the clutch coil 18', causing the chart advance drive and tachometer generator 72 to stop. This stops further input to the integrators 75 and 83, and acts as a protective feature to prevent overloading of the integrators by thus automatically stopping the computer operation should the operator fail to do so when a measurement cycle has been completed.

By the foregoing analysis, it is seen that:

(7) Input to integrator 83, $$V_{83} = K_a V_{72} = K_1 K_a K_c \frac{dr}{dt}$$

(8) from (7)

$$V_{83} dt = K_1 K_a K_c dr$$

(9) integrating (8)

$$\int_{t_1}^{t_2} V_{83} dt = K_1 K_a K_c \int_{r_1}^{r_2} dr = K_1 K_a K_c (r_2 - r_1)$$

where $A_2$ is the gain factor of integrator 83, the output of integrator 83 after a period of operational time $(t_2-t_1)$, is

(10) 
$$\int_{t_1}^{t_2} A_2 V_{83} dt = A_2 K_1 K_a K_c (r_2 - r_1)$$

Multiplying both sides of (9) by $A_2$ gives

(11) 
$$\int_{t_1}^{t_2} A_2 V_{83} dt = A_2 K_1 K_a K_c (r_2 - r_1)$$

As shown by (10), this is the output of the integrator 83; i.e., the integral of the tachometer 72 voltage for an operating period $(t_2-t_1)$ as modified by switch 66. Thus, this value is proportional to the recorded time period $(r_2-r_1)$; i.e., the angle $\theta$ through which the chart was rotated while the variable was being measured, and it is provided by the time integrator 83 simultaneously while the trace integrator 75 provides the integral output

(12) 
$$A_1 K_1 K_a K_c \int_{t_1}^{t_2} P \frac{dr}{dt} dt$$

A consideration of the relationship of the two integrals in the integrators 75 and 83 shows that a simple reconnection of these integrators so that the output of the time integrator 83 is connected to the input of the trace integrator 75 in a sense which will discharge the latter and a measurement of the time required for the resultant output of the trace integrator to become zero, can readily be utilized to provide a computation of the average of the trace variable which has been measured.

In order to utilize the integrated values measured by the integrators 75 and 83 upon completion of the measurement or tracing of a chart and before any switching reconnections of the integrators are made, the fact control rheostat pedal 21 is released. This deenergizes the magnetic clutch coil 18' by opening the microswitch 22 and stops operation of the chart advance drive and the tachometer generator 72.

In order now to begin the compute or readout cycle of the computer, a readout switch contactor 88 is manually operated from its trace position, FIG. 2, to its readout position in engagement with a contact 88'. This energizes the coil of the readout relay 37, which opens the contacts 36 and thereby further assures deenergization of the clutch 18 and a complete stoppage of the advance of the chart through the chart drive. Energizing of the relay 37 also simultaneously causes it to open contacts 73 and 74, thus, completely disconnecting the tachometer generator from the trace arm potentiometer 44 and from the time integrator 83.

Concurrently, the relay 37 opens contacts 89 which connect a condenser 90 to contacts 91 of a thermal time delay relay 92, the use of which will be explained later, and reconnects the condenser 90 to a charging voltage source by closing contacts 93.

Also simultaneously, the relay 37 closes the contacts 78, which connect a source of energizing voltage to the coil of relay 77, whereby this relay is energized and operates its contactor 76 to open the circuit through its contacts 76', thereby disconnecting the trace arm potentiometer 44 from the input to the trace integrator 75. The relay 77 contactor 76 then closes the circuit through its contacts 76", switching the time integrator 83 so that its output 94 is connected through relay contacts 95' of relay 95 and a scaling potentiometer 96 to the input of the trace integrator 75. This reconnection of the output of the time integrator 83 across the scaling potentiometer 96 functions to scale the output to agree with the particular abscissas of the chart being considered. This introduces a scaling factor $s$ into the value of the output of the time integrator, so that its effective voltage on the input to the trace integrator is $sA_2K_1K_aK_c(r_2-r_1)$.

This causes the trace integrator 75 to begin to integrate the voltage impressed thereon from the time integrator 83, with the initial voltage condition of the trace integrator for this integration. Thus, the voltage $E_{97}$ on the output 97 of the trace integrator 75 may be expressed as:

(13)
$$E_{97} = A_1K_1K_aK_c \int_{t_1}^{t_2} P\frac{dr}{dt}dt - A_2K_1K_aK_c(r_2-r_1)\int_0^T dT$$

where T is the time during which this integration takes place.

If the trace integrator is permitted to continue the integration of the time integrator voltage until its output voltage E goes to zero, the trace integrator output becomes:

(14)
$$E_{97} = A_1K_1K_aK_c \int_{t_1}^{t_2} P\frac{dr}{dt}dt -$$
$$sA_2K_1K_aK_c(r_2-r_1)\int_0^T dT = 0$$

(15) $\quad$ or $\int_0^T dT = \frac{A_1}{sA_2}\cdot\frac{1}{(r_2-r_1)}\int_{t_1}^{t_2} P\frac{dr}{dt}dt$

(16) $\quad$ From (5) $dr = \frac{1}{K_1K_c}V_{72}dt$

Multiplying both sides of (16) by P gives:

(17) $\quad Pdr = \frac{1}{K_1K_c}PV_{72}dt$

Integrating both sides of (17) between the respective limits of $r$ and $t$ occurring at corresponding operational times gives:

(18) $\quad \int_{r_1}^{r_2} Pdr = \frac{1}{K_1K_c}\int_{t_1}^{t_2} PV_{72}dt$

(19) $\quad$ or $K_1K_c\int_{r_1}^{r_2} Pdr \int_{t_1}^{t_2} PV_{72}dt$

Substituting the value of $V_{72}$ from (2) gives:

(20) $\quad K_1K_c\int_{r_1}^{r_2} Pdr - \int_{t_1}^{t_2} PK_1K_c\frac{dr}{dt}dt$

(21) $\quad$ or $\int_{r_1}^{r_2} Pdr = \int_{t_1}^{t_2} P\frac{dr}{dt}dt$

Substituting (21) in (15) gives:

(22) $\quad \int_0^T dT = \frac{A_1}{sA_2}\cdot\frac{1}{(r_2-r_1)}\int_{r_1}^{r_2} Pdr$ Equation 22 equals Equation 1 if the value $$\frac{A_1}{sA_2} = K_s$$

This desired result is obtained by adjustment of the scaling potentiometer 96 so as to make

(23) $\quad \frac{A_1}{sA_2} = K_s$

Substituting (23) in (22) and integrating (22) gives:

(24) $\quad T = K_s\frac{1}{(r_2-r_1)}\int_{r_1}^{r_2} Pdr$

A comparison of (24) with (1) shows that

(25) $\quad\quad K_sP \text{ (average)} = T$

Thus, it is clear that a measurement of the time T required to bring the output voltage of the trace integrator to zero, by its integration of the output of the time integrator, will give a measurement of the average value of the trace variable for the period during which the chart was read.

In order to determine when the output of the trace integrator 75 reaches zero so that the discharge time T can be measured, its output 97 is connected as one of the inputs to a zero detector 98. Any suitable voltage comparer or difference amplifier can be utilized as the zero detector 98, and such a comparer is described in "Transistor Circuits for Analog and Digital Systems," F. H. Blecher, 35 Bell System Technical Journal (1956), pp. 320–327. As shown in the diagrams, a second input to the zero detector is a null biasing voltage, which has been found to be practical in this type of computer, since there may be a slight tendency for the zero detector to drift in time, and the null input is used in the conventional manner to correct or adjust for such drift. This null voltage is provided by a suitable potentiometer 99. This type of zero detector will provide a voltage output of a given polarity until the two voltages which are being compared are substantially equal, at which time the output will switch to a voltage of opposite polariy. This switch in the polarity of the voltage of the zero detector can be used in order to control the measurement of the time T required for the trace integrator output to go to zero after the time integrator output has been connected by the relay 77 as the input to the trace integrator.

In order thus to measure the time T, a suitable AND gate 100 is provided. This gate may comprise any suitable arrangement and is illustrated as a three-input AND gate including three series connected PNP transistors 101, 102, and 103. Details of such a gate are shown and its operation described in "Design of Transistorized Circuits for Digital Computers," Pressman, Abraham, I.; John F. Richer Publisher, Inc. (1959), FIGS. 9–7, pp. 9–227–228. Measurement of the time T, which is directly proportional to the average of the chart variable P, is obtained by connection of a clock 104 to a suitable counter 105 which is capable of measuring the time T and visually indicating or displaying this measurement in terms calibrated as a digital value of the average of the chart variable P. This digital display may be made in any suitble manner, as on a galvanometer or on digital display units, such as the "In-Line" units appearing in the 1960–61 Electronic Designs Catalog, Series 2000, by Industrial Electronic Engineers, Inc.

In order thus to measure and provide a visual display of the average value of the chart variable, the clock 104 is of a type capable of providing periodic electrical pulses to the pulse counter 105, to which it is connected through the gate 100, in such a way that it will start sending pulses to the counter at the time when the time integrator output is connected to the input of the trace integrator, and these clock pulses will be shut off from the pulse counter at the time when the zero detector indicates that the trace integrator output has become zero. Thus, the number of pulses counted by the pulse counter during the time that the gate 100 was conductive and allowed pulses to pass from the clock 104 to the counter 105 is a direct measurement of the average of the chart variable P. Any suitable electrical pulse clock may be used, and such a clock is described on page 548 of "Electrical Instruments," Greenwood, I. A.; Holdam, J. V.; McCrae, D.; McGraw-Hill Book Company (1948).

As shown in FIG. 2, electrical pulses from the clock 104 are impressed on the base 101b of transistor 101, and these pulses are of a negative polarity such that the transistor 101 becomes conductive each time that clock pulse is impressed on the base 101b. Since the transistor 101 is connected in series with the transistor 102, none of the clock pulses will pass to the counter during the time that the computer is in its tracing or measuring cycle, as during this cycle the relay 77 is deenergized. When so deenergized, the contacts 108 are open-circuited, with the result that the transistor base 102b is not negatively biased, and this transistor is, therefore, not in the conductive state, thereby effectively closing the AND gate and preventing any of the clock pulses from reaching the counter 105.

In order for the counter 105 to start counting the clock pulses, it is necessary for the gate 100 to be completely turned on; that is, all three of the transistors must be in the conductive state for a clock pulse to pass to the counter. The bases 103b of the third transistor 103 is connected through a resistor 106 to the output 107 of the zero detector 98, so that as soon as the trace integrator begins to integrate the chart variable quantity during the trace or measurement cycle, the negative output voltage of the trace integrator impressed on the zero detector 98 will cause a negative voltage to be impressed on the base 103b of the AND gate transistor 103.

Thus, during the entire trace or measurement period, and as long as the output of the trace integrator 75 remains above zero during the compute cycle, the base 103b of the gate transistor 103 will be negative, so that this transistor will remain in the conductive state during these conditions. As a result two transistors 101 and 103 of the AND gate 100 are in the conductive state during all of the trace or measurement cycle and during the compute cycle as long as the trace integrator output remains above zero. No clock pulses from the clock 104 can reach the counter 105 until all three of the gate inputs are negative and the transistor 102 is not conductive during the trace or measurement cycle, as its base 102b is not negative during this cycle, since it is open-circuited through the contacts 108 of the relay 77 during this cycle of operation.

As previously explained, in order to start the compute cycle the readout switch contactor 88 is closed on its contact 88', so that the relay 37 is energized and closes a circuit through its contacts 78, thereby energizing the coil of the relay 77. Thus, as soon as the compute cycle is begun the relay 77 closes a circuit through its contacts 108, which impresses a negative biasing coincidence input control voltage on the base 102b of the AND gate transistor 102 from any suitable source. This places the transistor 102 in a conductive state, thus making all three transistors 101, 102, and 103 of the AND gate conductive during the compute cycle. As a result the pulses from the clock 104 are transmitted to the digital display counter 105.

When the trace integrator has integrated the output of the time integrator for a period such that the trace integrator output becomes zero, this zero voltage causes the zero detector 98 to switch its output voltage from a negative value to a positive value. Such a switch in the zero detector output voltage impresses a positive voltage on the gate transistor base 103b and thereby turns off the transistor 103, closing the AND gate 100 and cutting off further transmittal of clock pulses to the counter 105. At this point the digital display on the counter 105 is a direct measurement of the average value of the variable quantity P represented by the trace for the period which was measured.

The switching of the zero detector output voltage from a negative value to a positive value also is used in order to disconnect the time integrator output from the trace integrator input and to reconnect the trace integrator input to the trace arm potentiometer, so as to place these two integrators in condition for the start of a new measurement cycle. This is conveniently done by connecting the coil of the relay 77 through a PNP transistor 109 and biasing the base 109b of this transistor with the output voltage of the zero detector 98. Thus, during the entire measurement cycle and during the compute cycle as long as the trace integrator output voltage is above zero, so that the zero detector output voltage is negative, the transistor base 109b is biased by a negative voltage and the transistor 109 is in the conductive state. As soon as the zero detector switches its output from a negative to a positive voltage, when the trace integrator output voltage becomes zero, the voltage bias on the transistor base 109b becomes positive and the transistor 109 is placed in its non-conductive state. This deenergizes the coil of relay 77 so that its contactor 76 open-circuits its contacts 76", thereby disconnecting the time integrator output from the trace integrator input, after which the contactor 76 closes the circuit through the relay contacts 76', thereby connecting the input of the trace integrator to the trace arm potentiometer 44. This effectively reconnects both the trace integrator and a time integrator for the start of a new race or measurement cycle.

In order to assure an accurate measurement of the quantities which are integrated by the trace integrator 75 and the time integrator 83, it is desirable to provide a positive clearing of these two units prior to the start of each trace or measurement cycle. This clearing of the two integrators can very conveniently be performed by simply short-circuiting the condensers 82 and 86 and the amplifiers 81 and 85 of the integrators 75 and 83, respectively. In order thus to short-circuit these members of the two integrators, a clearing relay 110 is provided having an energizing coil connected in circuit with the readout relay contacts 89. As previously explained, when the readout relay 37 is energized during the compute cycle its contacts 89 are open-circuited and the condenser 90 is connected to a charging voltage through relay contacts 93. When the compute cycle has been completed and it is desired to start a new trace or measurement cycle, the switch contactor 88 is moved from its engagement with the readout contact 88' to its engagement with the trace contact 88". This latter contact is left disconnected, so that the coil of the readout relay 37 is deenergized in this position of switch contactor 88. Such deenergization causes the relay 37 to move to the position shown in FIG. 2, wherein its contacts 93 are open-circuited, thereby disconnecting the condenser 90 from its charging voltage source and connecting the condenser 90 through relay contacts 89 to the coil of the clearing relay 110. This causes a discharge of the condenser 90 through the coil of the clearing relay, thereby energizing the relay which closes a circuit through relay contacts 111. This short-circuits the trace integrator amplifier 81 and its condenser 82. Concurrently therewith, the relay 110 closes the circuit through its contacts 112, which short-circuits the amplifier 85 and the condenser 86 of the time integrator 83. Thus, whenever the readout switch contactor 88 is placed in its trace or measurement position for the start of a measurement cycle, both the trace and time integrators are effectively cleared by the energization of the clear relay 110. As soon as the condenser 90 has been fully discharged, the coil of the relay 110 becomes deenergized, and this relay returns to its open-circuit position, as shown in FIG. 2. Thus, the two integrators are effectively and rapidly cleared by the momentary energization of the clearing relay 110.

As previously explained, at the completion of a measurement or trace operation, the voltage at the output 97 of the trace integrator 75 is directly proportional to the integral of the variable traced by the trace arm 39 for the time the measurement was made as represented by the advance of the chart. A measurement of this voltage will provide the integral over this period. As also has been previously explained, this can be read on the counter 105 by impressing a fixed voltage on the input of the trace integrator 75 in a sense tending to discharge the trace integrator, and the time required for reducing $E_{97}$ to zero will be directly proportional and, therefore, represent the value of $E_{97}$. Thus, when $E_{97}=0$, the reading on the counter 105 will be the integral of the measured trace when the fixed voltage impressed on the trace integrator is properly scaled for the terms of the chart units in the same manner as for obtaining the average of the trace. As shown in FIGS. 1 and 2, this can be done by closing switch 115 on its contact 115' so as to energize relay 95. This opens relay contacts 95' and disconnects the time integrator 83, and closes relay contacts 95" and connects a fixed —12 volt voltage to the scaling potentiometer 96. The readout switch 108, FIG. 1, or 88, FIG. 2, is respectively turned to its readout position as explained with reference to the averaging readout procedure. The operation of the counter proceeds in the same manner as previously explained, and when the zero detector closes the AND gate 100, the count on the visual display of the counter 115 represents the time integral of the trace variable for the time measured by the trace arm.

Since the digital display counter 105 is adapted to count and to display a digital value which depends upon the discharge of the trace integrator 75, it also should be cleared and returned to a predetermined starting condition, so that it will properly show the final digital value for each complete operation of the computer without reference to any prior entry into the counter from a prior cycle of operation. Under some circumstances where the trace on a chart may not originate at zero but may start at some positive value, it is desirable to be able to enter this positive value into the digital display counter 105 by presetting the counter thereto prior to the start of any new entry, so that the final value displayed by the counter will accurately represent the quantity being measured. Such a presetting of the counter does not form a part of the present invention, as conventional counters on the market of the type previously referred to, have provision for thus presetting the counter. A detailed description of this presetting feature of the counter therefore will not be given.

The present invention does include a circuit for automatically operating the preset aspect of a counter, and this is conveniently obtained by energizing the presetting circuit input 116 of the counter concurrently with the clearing of the trace and time integrators. As shown in FIG. 2, the clearing relay 110 is provided with a set of contacts 113 connected to a source of potential and to the counter 105 preset input 116, such that when the relay 110 is energized by the condenser 90, the circuit through the contacts 113 is closed. This energizes the preset circuit of the counter 105 and effectively clears this counter of its previous display and sets its visual digital display to the value for which it has been preset. This preset value may, of course, be zero if the counter preset control is set to zero, as it would be if the trace on the chart being measured begins at a zero ordinate. This preset circuit also is effectively disconnected by the clearing relay 110 as soon as the condenser 90 has been discharged through the relay coil, thus placing the counter 105 in condition for the start of a new count as soon as the readout switch contactor 88 is again placed in its readout position in engagement with its contact 88'.

Whenever the computer has been inoperative for a period of time, it is desirable to have the counter 105 and the trace and time integrators fully cleared so as to assure accurate measurement and computations from the new traces which are to be measured. The present instrument includes an arrangement for automatically clearing these units of the computer at such a time. The main power switch 24 is provided with a contactor 27, which is operable concurrently with its other contactors 25 and 26, so that whenever the main power switch is turned to its ON position, the contactor 27 engages contact 34 and energizes the cathode or heater element of the thermal time delay relay 92 by connecting it across the main control potentiometer 31. As shown in FIG. 2, when the computer is put out of operation by having the main power switch 24 turned to either its standby or off positions, the cathode or heater of the thermal time delay relay 92 is turned off, and consequently cools down. When this occurs, the relay contacts 91 close. Whenever the computer is reconnected to a power source, this impresses an energizing voltage on the coil of the clearing relay 110 through the time delay contacts 91. This causes the clearing relay to operate and to clear the trace and time integrators and the counter 105 as previously described and to maintain this clearing circuit as long as the contacts 91 remain closed and connected to the energizing potential.

When the main power switch is initially closed, the energization of the heater in the thermal time delay relay 92 requires a predetermined lapse of time before it has reached a sufficiently high temperature to activate the elements which carry the relay contacts 91. After the passage of this predetermined time, the relay contacts 91 are opened and thereafter remain open as long as the main power switch remains closed in its ON position. Thus, whenever the computer has been out of use, it must be allowed to stand for a predetermined time, about one minute, after being turned on before it is used, so that the thermal time delay relay will have time to heat up and open its contacts 91. When these relay contacts 91 are thus opened, the coil of the clearing relay 110 is deenergized, and this relay then functions in accordance with the previously described mode of energization through the condenser 90. Provision is made in any suitable manner for disconnecting the energizing voltage from the relay contacts 91 whenever the computer is to be placed in an inoperative condition for any length of time. Any suitable switch can be provided for this purpose, and it may be a separate switch or may be simply interconnected into the general power supply for the computer and be obtained by a suitable tap from a transformer of the main power supply, if such a transformer is used.

STRIP CHART COMPUTER

In FIG. 3 a computer system is illustrated for determining a time average and an integral of a variable represented by a trace on a strip type chart. This figure is a highly simplified schematic diagram and illustrates only such details as are different from those shown in FIGS. 1 and 2 which are essential in order to adapt the circular chart computer there illustrated to strip type charts. It is to be understood that the various circuit details and safety implementations illustrated in FIGS. 1 and 2 are equally applicable to the computer shown in FIG. 3.

The major dfferences which must be made in a computer of the FIG. 3 type over the computer shown in FIGS. 1 and 2 are in the features for reading or tracing the charts and the related measuring equipment. Strip type charts are basically only of two types: those evenly spaced divisions across the width of a chart for measuring the magnitude of a variable; and those which have square root function ordinates; that is, those which vary as a square root function the spacing of the measurements of the variable across the width of a chart.

Since linear ordinates are equally spaced whether the zero base or origin is on the left-hand or the right-hand side of a chart, only one linearly variable resistance is needed in the trace arm potentiometer which is used to measure the ordinates of such charts. In contrast to circular charts which normally have only one type of square root function ordinate which increases from zero outwardly in a clockwise direction, strip charts may with equal facility have square root function ordinates which increase from a zero base or origin beginning either on the left-hand or on the right-hand side of a chart. Since a square root function resistance potentiometer varies from its zero base or origin in one definite direction for increasing values, it is not possible to connect such a square root function resistance poteniometer for reading in either directions. A simple provision of two square root function resistance potentiometers with a function selecting switch to provide for the proper connection is provided so as to make the present computer usable with any type of linear or square root function ordinate chart. In most strip charts the abscissas are linearly variable and indicated by evenly spaced linear divisions lengthwise of the strip charts.

In order to provide for the proper measurement of variables represented on strip type charts, the chart drive and tracing features have been modified from those shown in FIGS. 1 and 2 in order accurately to measure variables on such charts. The different measuring, control, and computing elements in FIG. 3 which are the same as shown in FIGS. 1 and 2 carry the same reference numerals, so that a detailed explanation of their operation will not be given since they function in the same manner as has already been explained.

As shown in FIG. 3, a strip chart 10', of any conventional type, is shown rotatably supported on a mounting 12', which may comprise any suitable spindle, and is arranged with its leading edge secured to a take-up reel 11'. The drive reel is adapted to be driven at a suitable speed under the control of an operator of the computer. Power is transmitted to the reel 11' from a suitable drive motor 17 connected to the drive reel through a clutch 18, which may be an electromagnetic clutch as shown in FIGS. 1 and 2, adapted to complete the drive through a suitable chart advance drive include a shaft 16, and associated speed changing drive means, such as gears. Also as previously described, the motor speed is adapted to be controlled in order to facilitate operation of the instrument and this can be provided through any suitable speed control system, such as the rheostat 19, which connects the motor to a suitable source of electrical power supply 20. Details of this speed control and its connection to the source of power 20 may be the same as those illustrated in FIG. 2.

STRIP CHART RACING AND MEASURING

In order to measure the variable represented by a trace 38' on a strip chart 10', a transversely movable trace arm 39" is provided with a pointer 39' on the end thereof adapted to be moved manually and kept as nearly as possible on the center of the trace 38' as the reel 11' draws the chart 10' longitudinally under the pointer. The speed of advance of the chart 10' can be readily controlled by the operator through the speed control rheostat 19, so that if a chart be very irregular, its advance can be slowed down to enable the operator to follow accurately the chart variations; while if the chart be relatively regular, the speed of advance can be increased through the speed control rheostat 19.

Movement of the trace arm pointer 39' in following a trace 38' will carry the trace arms potentiometer wiper arm transversely across three resistances 42", 46', and 46" and in so moving will carry potentiometer wiper contacts 42', 43', and 43", respectively, across the three potentiometer resistances. As in the circular chart computer, the trace arm potentiometer is adapted to be connected across a tachometer generator 72 which is driven by the motor 17 through the clutch 18 at a speed directly proportional to the speed advance of the chart pickup reel 11'. The voltage of the tachometer generator 72 is, therefore, directly proportional to the advance of the chart 10' and, therefore, directly proportional to the linear abscissas of this chart. In order to make the trace arm potentiometer universally usable with both types of linear charts and both types of square root function charts, a function selector switch 47' is provided which is connected to the trace arm potentiometer in a manner similar to the function selector switch 47 shown in FIG. 2. Since strip charts do not have nonlinear abscissas of the type correspoding to circular charts on which the abscissas vary regularly along radii of the circular chart, the present function switch 47' is not provided with three wafers as in FIG. 2.

In this construction the linear resistance branch 42" of the potentiometer is adapted to be reversibly connected across the tachometer generator 72 by the contactor 48 of the function selector switch in accordance with the side of the strip chart from which the ordinates increase in value. These ordinates may not always begin at zero on the chart, and it is, therefore, desirable to be able to compensate for the base or original ordinate value of a particular chart in order to obtain an accurate measurement of the variable represented by the trace on the chart. This is similar to such a nonzero origin of circular charts and can be compensated in the same manner by providing for presetting of the counter as will be explained later. The function selector switch 47' illustrated in this figure is shown with the contactor 48 in engagement with contact 51 and the contactor 49 in engagement with the contact 52, thus giving the trace arm potentiometer wiper 42' an increasing voltage movement from right to left with a corresponding movement of the trace arm 39" and, therefore, usable in measuring a trace having an origin on the right-hand side as viewed in this figure. For traces having a left-hand origin, the trace arm wiper 42' can be made to have an increasing voltage change from the left-hand side of the linear resistance branch 42" of the potentiometer by turning the function selector switch 47' to its second position in which the contactor 48 engages contact 63 and the contactor 49 engages contact 54. This simply reverses the ends of the resistance 42" in its connection across the tachometer generator 72. As in the FIGS. 1 and 2 computer, the tachometer generator 62 is provided with a zero adjusting potentiometer, which comprises a linearly variable resistance 65 connected directly across the terminals of the tachometer generator 72, with a wiper contactor 65' connected to ground and movable across the potentiometer resistance 65. The operation of this zero adjustment is exactly the same as explained with reference to FIGS. 1 and 2.

In the case where the ordinates of a strip chart 10' vary as a square root function, the zero or origin reference also may be on either the left-hand or right-hand side of the chart, nad in order to measure these two types of charts the trace arm potentiometer 44' is adapted to be connected across the tachometer generator 72 through the function selector switch 47' so that the proper respective potentiometer resistance 46′ and 46″ is effectively connected in the measurement circuits of the computer. As illustrated in FIGURE 3, in a strip chart wherein the square root function ordinates increase toward the left, this switch 47′ is turned to a position in which the contactor 48 engages contact 62 and the contactor 49 concurrently engages contact 63. This places the square root function resistor 46′ across the tachometer generator 72, and movement of the trace arm 39 will vary the potentiometer voltage in accordance with the position of the trace arm potentiometer slider 43′. Where the strip chart 10′ is a square root function ordinate chart in which the ordinates increase toward the right on the illustrated chart, the function switch 47′ is turned to the position in which its contactor 48 is in engagement with contact 62′ and its contactor 49 is concurrently turned in engagement with contact 63′. This places the trace arm potentiometer resistance 46″ in circuit across the tachometer generator 72, and movement of the trace arm 39″ varies the trace arm potentiometer voltage in accordance with the position of the wiper 43″ in engagement with the resistance 46″, so that the potentiometer output varies directly in accordance with the square root function represented by the curve 38′ of this type of strip chart. Thus, it is seen that the illustrated trace arm potentiometer may be used for any of the conventional linear or square root function types of strip chart.

As in the case of the computer shown in FIGS. 1 and 2, the rotation of the tachometer generator 72 is directly proportional to the advance of the chart 10′ so that the integral of the tachometer generator instantaneous voltage represents a direct measurement of the advance of the chart 10′. Similarly, the output voltage of the trace arm potentiometer, measured between any of its respective wipers connected in the measuring circuit and ground, is a measurement of the instantaneous magnitude of the variable represented by the trace 38′ on the strip chart. Since this voltage is the tachometer generator output voltage as modified by the trace arm potentiometer resistances, it can be expressed as $$K_2 P \frac{d\theta}{dt}$$

where P represents the position of the trace arm pointer 39′ and, therefore, the instantaneous value of the chart variable which is being traced, and $K_2$ represents a proportionality constant determined by circuit parameters of the trace arm potentiometer and associated trace reading circuits. It is readily seen that this is the same expression as that derived with reference to the instruments shown in FIGS. 1 and 2 and, consequently, can be used in the same manner in order to compute time averages and integrals of the trace variable in question.

COMPUTING TIME-AVERAGES AND INTEGRALS FOR STRIP CHARTS

In this computer, the determinations of time averages and integrals of trace variables is adapted to be performed in substantially the same manner as in the computer shown in FIGS. 1 and 2. The connections of the trace arm potentiometer to the trace integrator 75 are made in the same manner through a contactor 76 which is adapted to engage a contact 76′ in order to integrate the instantaneous values of the trace variable with respect to time. Concurrently with this integration, contactor 87 is closed on contact 87′ and connects time integrator 83 across the tachometer generator and integrates the advance or time abscissa of the chart.

In order to obtain a time average of the trace variable 38′, contactor 76 is closed into engagement with contact 76″, and concurrently therewith, the engagement of contactor 87 with contact 87′ is opened, while the contacts 108 are closed. This connects the time integrator output to the trace integrator input through a scaling potentiometer 96, as explained with reference to the first embodiment of this invention, in a manner tending to discharge the trace integrator. The output of the trace integrator is connected as an input to a zero detector 98, the output of which forms one of the inputs 103 to a three-input AND gate 100. The second input of this AND gate 100 is the control voltage placed thereon by closure of the contacts 108, which impresses a negative voltage on the gate input 102. A suitable electrical pulsing clock 104, which may be of the same type of that described with reference to the first described embodiment, is connected to the third input 101 of the AND gate, so that when all three of these inputs are at a negative voltage, pulses will pass from the AND gate 100 to an input of a suitable counter 105. This counter may be of the same type as that disclosed with reference to the first described embodiment of this invention, and may also be provided with a presetting circuit 116 of the type previously described. In this manner, the counter 105 will count the clock pulses from the clock 104 and display these in any suitable manner, as by digital display units, until the zero detector 98 detects that the output voltage of the trace integrator has been reduced to zero. When this occurs, the voltage on the zero detector output 107 will change to a positive voltage, so that the AND gate 100 will be closed, and no further clock pulses will be admitted into the counter 105. The final count display by the coutner 105 will represent the time average of the trace variable which was read or traced by the pointer 39′. The mathematical derivation and reasons for this result are the same as those explained with reference to FIGS. 1 and 2.

A time integration of the variable represented by the trace 38′ can also be obtained in the same manner as with the first described computer simply by placing the switch contactor 115 in engagement with its contact 115′, so as to energize relay 95. This open-circuits the output of the time integrator through contacts 95′, and then closes a fixed voltage through relay contacts 95″ across the scaling potentiometer 96, such that this scaled fixed voltage can be impressed on the input of the trace integrator when its input switch contactor 76 is placed in engagement with contact 76″ and concurrently the contacts 108 are closed. This will cause the trace integrator to integrate the scaled constant voltage until its output reaches zero, and, with the illustrated connection, the counter 105 will integrate clock pulses from the clock 104 through the AND gate 100 until the zero detector 98 detects that the trace integrator voltage has been reduced to zero. As in the previous instances, this will cause the zero detector voltage to shift to a positive value and close the AND gate 100. The count on the visual display of the counter 105 at this point will represent the time integral of the trace variable 38′ which has been read or traced by the pointer 39′. The mathematical derivation and explanation of this operation of the computer in integrating the trace variable is the same as that previously given with reference to the computer illustrated in FIGS. 1 and 2.

Clearing of the integrators after a computation may desirably be obtained simply by concurrently closing contacts 111 so as to short-circuit the trace integrator amplifier 81 and condenser 82 and closing contacts 112 so as to short-circuit the time integrator amplifier 85 and its condenser 86. The contacts 111 and 112 are opened prior to making any measurement by the computer. The control of these clearing contacts may includes circuits similar to those shown in FIG. 2, and a further clearing circuit also may be included in connection with the main power switch and a thermal time delay relay such as that shown in FIG. 2. This clearing feature is desirable in order to assure accurate measurements.

FIG. 4 CIRCULAR CHART COMPUTER

In FIG. 4 a computer system is illustrated which is very similar to that shown in FIGS. 1 and 2, and the same parts are identified by the same reference numerals as in these previously described figures. This computer is particularly adapted for reading or tracing circular charts and for determining a time average and an integral of a variable represented by a trace on such a chart. In the embodiment illustrated in this figure the circular chart advance drive is exactly the same as that shown in FIGS. 1 and 2.

FIG. 4 CIRCULAR CHART TRACING AND MEASURING

The computer illustrated in this figure is provided with the same chart tracing features for determining the ordinates of a circular chart as those shown in FIGS. 1 and 2. These include a trace arm 39 and an associated potentiometer 44 to which a reference voltage is supplied by a tachometer generator 72, with a zero adjusting potentiometer 65. The output of the trace arm potentiometer is adapted to be connected to the input of a trace integrator 75 through a contact 76' and a contactor 76 in the same manner as explained with reference to these features in FIGS. 1 and 2.

In this embodiment, the measurement of the abscissas or advance of the circular chart is measured by a simplified integrating transducer which includes a chart advance potentiometer 120. This potentiometer comprises a linearly variable resistance 121 which is connected between a fixed potential and ground. A wiper contactor 122 is arranged in engagement with the resistance 121 and is adapted to be moved across this resistance in contact therewith and in accordance with the advance of the circular chart 10 while it is traced by the trace arm 39. This movement of the chart advance potentiometer contactor 122 may be provided in any suitable manner, and preferably comprises a drive shaft 123 coupled to the chart advance shaft 16 through suitable reduction gearing, such as a spur gear 124 in engagement with a worm 125. This movement of the wiper contactor produces a corresponding variation of the voltage between the wiper contactor 122 and ground, this voltage increasing directly in accordance with the advance of the wiper contactor, thereby giving a direct indication of the advance of the chart 10 for any specific reading. In all cases before a new reading or tracing of a chart is to be begun, the wiper contactor 122 of the chart advance potentiometer must be returned to its zero position at the ground connection end of the potentiometer resistance 121. This can readily be provided by any suitable conventional one-way drive or slip clutch between the wiper contactor 122 and its driving spur gear 124. Details of such a one-way drive or slip clutch do not form part of the present invention and, therefore, are not illustrated in this figure.

FIG. 4 CIRCULAR CHART TIME-AVERAGE AND INTEGRAL COMPUTING

In this computer the determinations of time averages and integrals of trace variables are performed in the same basic manner as in the computers previously described. The computation of a trace integral by this instrument is performed in exactly the same manner as in the instruments already described, simply by closing a switch contactor 115 on its contact 115', so as to energize relay 95 which opens its contacts 95' and closes its contacts 95". This impresses a constant voltage across the scaling potentiometer 96. Also in order to perform the desired integration the switch contact 76 is disengaged from its contact 76' and then closed on its contact 76". This connects the scaling potentiometer 96 to the input of the trace integrator 75, in a sense tending to discharge the integrator, so that the trace integrator begins to integrate the constant voltage as scaled by the scaling potentiometer 96. Simultaneously with this closure of the switch contactor 76 on its contact 76", the contacts 108 are closed, thereby impressing a negative potential on the input 102 of a three-input AND gate 100. The clock 104 is an electrical pulsing clock, of the type previously described, connected so as to impress negative pulses on input 101 of the AND gate 100. The third input 103 to the AND gate 100 is connected to the output 107 of zero detector 98, which has an input thereof connected to the output 97 of trace integrator 75. Thus, when the switch contacts 108 are closed and the trace integrator 75 begins to integrate the scaled constant potential impressed on its input by the scaling potentiometer 96, the AND gate 100 will pass clock pulses to the counter 105 and this counter will give a digital display of the count entered therein in the same manner as previously described with reference to the other computers.

When the trace integrator has been fully discharged and its output has been reduced to zero, the zero detector 98 will impress a positive voltage on the AND gate input 103, thereby closing the gate 100 and suppressing the entry of further clock pulses into the counter 105. The digital count displayed on the counter 105 at this point is a direct indication of the integral of the chart variable 38 which was traced by the trace arm 39. This operation and its mathematical derivation is exactly the same as that explained with reference to FIGS. 1 and 2. Also, as there described, it may be desirable to preset the counter 105 if the origin of the chart ordinates do not begin at zero. Such a presetting is provided for by the preset circuit 116, which also is the same as has been previously described.

In order to obtain a digital display by the counter 105 indicating the time average of the chart variable 38 for any given period, the scaled potential impressed on the input of the trace integrator by the scaling potentiometer 96 must be directly representative of the period for which the variable 38 was traced by the trace arm 39. This potential is obtained for this purpose in the present embodiment from the chart advance potentiometer 120. As shown in FIG. 4, the switch contactor 115 is in its averaging position, disengaged from its contact 115', so that the coil of relay 95 is deenergized. When thus deenergized, the relay closes a circuit through its contacts 95', which places a voltage across the scaling potentiometer which corresponds to the relative movement of the chart advance potentiometer contactor 122 over the resistance 121. Since this relative movement is directly proportional to the advance of the chart 10 during the period for which it was traced, this voltage is directly representative of an integration of the time abscissa for which the chart 10 was advanced while its ordinates were integrated by its trace integrator 75. The scaling potentiometer 96 serves the same purpose in this embodiment as in the previously described computers in order to scale the potential impressed across it, so that the voltage impressed on the trace integrator input will have the correct respective relation to the integrated voltage of the trace integrator for the period during which the chart variable 38 was traced. Thus, with this connection of the chart advance potentiometer 120 to the trace integrator 75 in a sense tending to discharge it, the time required for complete discharge of the trace integrator by the voltage input thereto from the chart advance potentiometer is a direct measurement of the time average of the chart variable 38 for the period during which it was traced.

To obtain a time average of the trace variable 38 on the chart 10, the contactor 76 is closed on its contact 76". This breaks the connection of the trace integrator to the trace arm potentiometer through the contact 76'. This position of the contactor 76 impresses on the input of the trace integrator 75 the scaled potential of the scaling potentiometer 96. Concurrently with the closure of the contactor 76 on its contact 76", the contacts 108 are closed, thereby impressing on input 102 of the three input AND gate 100 a fixed negative potential, whereby the gate is opened permitting the entry of clock pulses into the counter 105 from the electrical pulsing clock 104.

This is made possible because the trace integrator output 97 is connected, as previously described, to one of the inputs of the zero detector 98, so that it impresses a negative potential on the third input 103 of the AND gate 100 as long as the trace integrator output remains negative. As previously explained, when the trace integrator output reaches zero, the zero detector output shifts to a positive potential and thereby closes the AND gate 100, so that no further pulses from the clock can enter the counter 105 and the digital display on the counter at this time is the time average of the trace variable for the period measured.

The mathematical derivation for this result is exactly the same as that already described with reference to FIGS. 1 and 2. Since the movement of the potentiometer contactor 122 is directly proportional to the advance of the chart, the voltage impressed on the scaling potentiometer 96 by the chart advance potentiometer 120 may be represented by $K_4(\theta)$, where $\theta$ is the angle through which the chart 10 is rotated while the variable is being measured, and $K_4$ is a proportionality constant determined by various circuit and mechanical apparatus parameters. This expression $K_4(\theta)$ is the same value as the integral of the time integrator 83 $K_1(\theta)$ described with reference to FIGS. 1 and 2. Thus, the digital display on the counter 105, at the time that the trace integrator in the present embodiment goes to zero, is a direct measurement of the time average of the variable 38 for the period during which it was traced by the arm 39.

Clearing of the trace integrator 75 and of the counter 105 after each computation and before the start of a new computation can be obtained in the same manner and with the same elements as explained with reference to FIGS. 1 and 2. As previously indicated, in every instance before a new measurement is made, the chart advance potentiometer wiper contactor 122 must be returned to its zero position in contact with the ground connection of the resistance 121 in order to assure an accurate measurement of the period during which a measurement is made.

An overrun maximum period or time control circuit similar to the transistor 80 and associated relay 35, FIG. 2, may also be provided, wherein the transistor base is similarly responsive to a predetermined voltage of the time abscissa integrator, which in this case is the voltage on the potentiometer wiper 122. An automatic disconnection of the trace integrator input from the time abscissa integrator when the trace integrator output goes to zero and the reconnection of these as shown in this figure also can be provided by the same control circuits as in FIG. 2 comprising the transistor 109 and the relay 77 circuitry.

FIG. 5 STRIP CHART COMPUTER

In FIGURE 5 a computer system is illustrated for determining a time average and an integral of a variable represented by a trace 38' on a strip type chart 10'. This figure is a highly simplified schematic diagram similar to FIGS. 1, 3, and 4, including many elements and circuits common to these figures and to FIG. 2. Features illustrated in this figure which have been illustrated and described with reference to the previous embodiment of this invention are identified by the same reference numerals as those in other figures.

FIG. 5 TRACING AND MEASURING

In this embodiment the structure and circuits for tracing and measuring the ordinates of a trace 38' are the same as those illustrated in FIG. 3. As in this prior embodiment, the trace 38' is adapted to be traced by a pointer 39' which will vary the potential respectively on one of three trace arm potentiometer resistance 42'', 46', and 46'' according to the type of ordinate as selected by a function switch 47', while the strip chart 10' is advanced under the pointer. The advance of the strip chart 10' is adapted to be controlled by a speed control in the same manner as in all of the previously described embodiments, which varies the speed of a drive motor 17. The drive motor 17 in the present embodiment is adapted to supply power for advancing the chart 10' through a suitable clutch 18, preferably of the electromagnetic type, and also to drive a tachometer generator 72 at a speed directly proportional to the speed at which the chart 10' is advanced. In most instances it will be found desirable to drive the tachometer generator at a higher speed than the speed of the take-up reel 11' which controls the advance of the strip charts, and, therefore, a direct drive change-speed mechanism 130 is arranged to provide a driving connection between the clutch output shaft 16 and the drive shaft 131 of the take-up reel 11'. Details of the change-speed mechanism 130 do not form part of the present invention and, therefore, are not illustrated or described in detail. This change-speed mechanism can be of any suitable type, preferably including a direct reduction gearing system, so that the take-up reel drive shaft 131 is driven in a direct ratio to the speed of the clutch output shaft 16, but at a much lower speed.

The measurement of the trace variable 38' is adapted to be time integrated, as in all of the previous embodiments, and particularly as explained with reference in FIG. 3, by closing the contactor 76 on its contact 76', so that the output of the trace arm potentiometer 44' is connected to the input of the trace integrator 75. This trace integrator may be exactly the same as those previously described with reference to FIGS. 1–4 and is adapted to be cleared by a short-circuiting switch 111, as described with reference to these other figures.

The measurement of the period during which the trace variable 38' is measured is obtained in the same manner as explained with reference to FIG. 4, wherein the transducer for changing the mechanical advance of the chart into an electrical characteristic comprises a chart advance potentiometer 120, having a wiper contactor 122 in conductive engagement with a linearly variable resistance 121 connected across a fixed potential, with one terminal grounded. As in the FIG. 4 construction, the wiper contactor 122 is driven at a speed directly proportional to the advance of the strip chart such that its position with reference to the resistance 121 bears a direct relationship to the advance of the strip chart 10'. Thus, the voltage across this potentiometer wiper to ground is directly proportional to the advance of the strip chart for the period measured.

FIG. 5 STRIP CHART COMPUTATION OF TIME AVERAGE AND INTEGRAL OF TRACES

The determination of the integral of a trace variable 38' for a period of advance of the strip chart 10' is obtained by this computer simply by shifting the contactor 76 from its engagement with its contact 76' into an engagement with its contact 76'' and concurrently closing the circuit between the contacts 108. The switch contactor 115 also must be closed on its contact 115', so as to energize the coil of the relay 95 which will open-circuit its contacts 95' and close a circuit through its contacts 95''. This latter circuit is connected to place the scaling potentiometer 96 voltage on the input of the trace integrator 75 in a sense tending to discharge the integrator, so that the integrator will begin to integrate this scaled potential whereby its output will decrease toward zero. In the present instance this scaled potential will be predetermined by a constant voltage connected across the scaling potentiometer by the relay 95 through its contacts 95''. The operation of this integrating computation is exactly the same as that explained with reference to the previous embodiments, so that the counter 105 will provide a digital display of his integrated value at the time that the gate 100 is closed when the output of the trace integrator goes to zero. The mathematical explanation of this is exactly the same as that given with reference to FIGS. 1 and 2.

The time averaged value of the trace 38', for any period of advance, during which a trace is measured through the tracing arm potentiometer 44' and integrated by the trace integrator 75, is readily obtained by connecting the potential across the chart advance potentiometer wiper 122 to the input of the trace integrator 75 in a sense tending to discharge the integrator, and measuring the time required to do so. This can be done by having the switch contactor 115 in the position shown in FIG. 5, so that the relay 95 is deenergized, whereby a circuit is closed through the relay contacts 95′ placing the chart advance potentiometer wiper 122 across the scaling potentiometer 96. In addition, the contactor 76 is closed upon its contact 76″ and concurrently therewith the contacts 108 are closed. This impresses the voltage of the chart advance potentiometer wiper as scaled by the scaling potentiometer 96 on the input of the trace integrator 75, and concurrently impresses a negative voltage through the contacts 108 on the AND gate input 102. As a result clock pulses from the clock 104 enter the counter 105 through the AND gate 100, until the output of the trace integrator reaches zero in the same manner as has been explained with reference to other embodiments of this invention. When the trace integrator output voltage becomes zero, the zero detector output voltage is shifted from negative to positive, shutting the AND gate 100, and preventing the entry of any further clock pulses into the counter 105. Thus, the counter 105 at this time provides a digital display of the average of the chart variable 38′ which was traced by the pointer 39′ for a period corresponding to the position of the chart advance potentiometer wiper 122.

The mathematical derivation and the reasons why this equipment thus connected provides this time average of the trace variable 38′ are the same as those explained in detail with reference to the other embodiments of this invention.

In this computer, as in the previously described systems, it may be desirable to preset the counter 105 because the origin of the trace ordinates may not be zero. Such a presetting of a counter to a value corresponding to the origin of the trace ordinates in order to give an accurate measurement thereof can conveniently be provided through a presetting circuit 116, the same as has been described with reference to other embodiments of this invention.

As in the arrangement shown in FIG. 4, it is desirable to clear the trace integrator and the counter in the manner described with reference to other embodiments of this invention, and it is also necessary to return the chart advance potentiometer wiper contact 122 to its zero or ground position before initiating any new measurement or tracing in order to obtain accurate measurements.

An overrun maximum period of the time control circuit, similar to the transistor 80 and associated relay 35, FIG. 2, may also be provided, wherein the transistor base is similarly responsive to a predetermined voltage of the time abscissa integrator, which in this case is the voltage on the potentiometer wiper 122. An automatic disconnection of the trace integrator input from the time abscissa integrator when the trace integrator output goes to zero and the reconnection of these as shown in this figure also can be provided by the same control circuits as in FIG. 2, comprising the transistor 109 and the relay 77 circuitry.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. An electronic analog chart trace computer comprising means for advancing a chart along the abscissas thereof, means for generating a voltage responsive to the speed of said chart advancing means, a tracing arm operable for following a trace variable on a chart on said chart advancing means, means responsive to the position of said tracing arm for providing an output voltage corresponding in value to the trace variable ordinate value in accordance with the position of said tracing arm, means for connecting said chart advancing speed responsive voltage to said tracing arm position voltage responsive means such that the speed responsive voltage is modified in accordance with said trace variable ordinate value, means for providing a voltage corresponding to the chart abscissa advance for the period traced by said tracing arm, an electronic trace-variable integrator, a readout means operable for selectively connecting to and impressing on the input of said trace-variable integrator said speed responsive tracing arm position modified voltage for producing an output voltage on said trace variable integrator directly proportional to the integral of the chart trace variable as traced by said tracing arm for the period traced and alternatively subsequently connecting to and impressing on said trace variable integrator input another voltage source of a polarity tending to discharge said integrator, means connected to said trace-variable integrator for detecting by a zero output voltage therefrom a complete discharge thereof by said another voltage, and means controllably connected to said zero output voltage detecting means for measuring the discharge time of said trace-variable integrator providing a resultant measurement indicative of the value represented by the chart trace variable.

2. A computer as defined in claim 1 wherein said chart advancing means comprises a circular chart supporting turntable.

3. A computer as defined in claim 1 wherein said another voltage source for discharging said trace-variable integrator is said chart abscissa advance measuring voltage means.

4. A computer as defined in claim 1 wherein said tracing arm is a manually operable means.

5. A computer as defined in claim 1 wherein said chart advancing means comprises a strip chart drive for providing an advance travel of a strip chart over a predetermined area in the path of movement of said tracing arm.

6. A computer as defined in claim 5 wherein said chart advancing means includes means for manually controlling the speed of advance thereof.

7. An electronic analog chart trace computer comprising a chart advancing means, means including a generator connected for operation in accordance with the speed of said chart advancing means for generating a voltage in accordance with said speed, a tracing arm operable for following a trace variable on a chart driven by said chart advancing means, a tracing arm potentiometer assembly connected to and operable by said tracing arm for providing a potentiometer output voltage corresponding in value to the trace variable value in accordance with the displacement of said tracing arm, means for connecting said generator to said tracing arm potentiometer such that the voltage from said generator is modified as the output voltage of said potentiometer in accordance with said trace variable value, an electronic trace variable integrator, another voltage source, a readout means operable for selectively connecting to and impressing on the input of said trace variable integrator said tracing arm potentiometer output voltage for producing an output voltage on said trace variable integrator directly proportional to the integral of the value of the trace chart variable as traced by said tracing arm for the period traced and alternatively subsequently connecting to and impressing on said trace variable integrator input said another voltage source in a sense relationship tending to discharge said integrator, a three-input AND gate, means including an electrical pulsing clock means connected for impressing periodic pulses on one of said AND gate inputs, an AND gate coincidence input voltage source, said readout means including means for connecting and impressing said coincidence input voltage source on a second input of said AND gate when said readout means is operated to impress said another voltage on the input of said trace variable integrator, a zero voltage detector, means for connecting the output of said trace variable integrator as an input to said zero voltage detector, means for connecting and impressing the output of said zero voltage detector on the third input of said AND gate whereby said gate provides for passage of said clock pulses until said zero voltage detector detects a zero output voltage from said trace variable integrator by a complete discharge thereof by said another voltage whereat said zero detector output changes polarity and closes said gate, means for counting said pulses passed by said gate during the conductive period thereof and providing a resultant measurement indicative of the value represented by the chart trace variable as traced by said tracing arm.

8. A computer as defined in claim 7 wherein said readout means is manually operable selectively to connect and impress the stated voltages on the input of said trace variable integrator.

9. A computer as defined in claim 7 wherein said tracing arm potentiometer assembly is constructed and is operable by said tracing arm for producing an output voltage therefrom directly in accordance with the relative displacement of said tracing arm.

10. A computer as defined in claim 7 wherein said tracing arm potentiometer assembly is constructed for providing an output voltage therefrom in accordance with the square root value represented by the displacement of said tracing arm.

11. A computer as defined in claim 7 wherein said potentiometer assembly is constructed with a branch for providing a voltage output directly in accordance with the relative displacement of said tracing arm and another branch for providing an output voltage in accordance with the square root value represented by the displacement of said tracing arm with means for selectively connecting said generator to said two potentiometer branches according to the corresponding linear and square root ordinates of a chart being traced.

12. A computer as defined in claim 7 wherein means is provided for adjusting the zero value position of said tracing arm potentiometer for providing an output voltage thereto having a zero reference value corresponding to a zero value position of said tracing arm for the chart being traced thereby.

13. A computer as defined in claim 7 wherein said readout means for connecting said another voltage source to said trace variable integrator input includes means connected to be responsive to the output of said zero voltage detector for disconnecting said another voltage source from said trace variable integrator input when said zero voltage detector detects a zero voltage output from said trace variable integrator and for thereat reconnecting said trace variable integrator input to said tracing arm potentiometer output.

14. A computer as defined in claim 7 wherein said chart advancing means includes means for manually controlling the speed thereof.

15. A computer as defined in claim 7 wherein said pulse counting means includes means for presetting an initial count therein for starting the resultant indicated measurement at an initial desired non-zero value.

16. A computer as defined in claim 7 wherein said means for connecting said another voltage source to said trace variable integrator input includes means for scaling the magnitude of said another voltage according to a predetermined ratio dependent upon the scale of the chart being traced.

17. A computer as defined in claim 7 wherein said tracing arm potentiometer and generator connecting means also selectively provides for a zero to full scale output potentiometer square root function voltage for either direction of movement of said tracing arm.

18. A computer as defined in claim 7 wherein said tracing arm potentiometer includes means for varying the output voltage thereof in accordance with the position of said tracing arm linearly and as a square root function, and wherein said means for connecting said tracing arm potentiometer to said generator selectively provides by said connection for either said linearly variable or square root function voltage and also selectively provides by said connection for said linearly variable voltage from zero to full scale output for either direction of movement of said tracing arm.

19. A computer as defined in claim 18 wherein said tracing arm potentiometer and generator connecting means also selectively provides for a zero to full scale output potentiometer square root function voltage for either direction of movement of said tracing arm.

20. A computer as defined in claim 7 wherein said chart advancing means comprises a turntable for supporting a circular chart, and said tracing arm having a pivotal mounting and being operably connected to said tracing arm potentiometer to provide for directly varying the potentiometer output voltage in accordance with the angular displacement of said tracing arm from an initial to a full scale position.

21. A computer as defined in claim 20 wherein said tracing arm potentiometer includes means for varying the output voltage thereof in accordance with the angular position of said tracing arm linearly and as a square root function, and wherein said means for connecting said tracing arm potentiometer to said generator selectively provides by said connection for either said linearly variable or square root function voltage and also selectively provides by said connection for said linearly variable voltage from zero to full scale output for either clockwise or counterclockwise movement of said tracing arm.

22. A computer as defined in claim 21 wherein said means for connecting said tracing arm potentiometer to said generator also includes voltage function variable means and selectively provides by said connection for varying the potentiometer linearly variable output voltage by said voltage function variable means for providing a linearly variable voltage in accordance with angular movements of said tracing arm in tracing an equally radially spaced ordinate circular chart.

23. A computer as defined in claim 7 wherein said chart advancing means includes means for starting and stopping the operation thereof.

24. A computer as defined in claim 23 wherein said starting and stopping means includes means for automatically connecting a clearing voltage means on the input of said integrator for restoring the integrator output to zero and thereafter automatically disconnecting said voltage clearing voltage means from said integrator input.

25. A computer as defined in claim 7 wherein said chart advancing means includes a controllable variable speed motor drive.

26. A computer as defined in claim 25 wherein said readout means for connecting said another voltage source to said trace variable integrator input includes means connected to be responsive to the output of said zero voltage detector for disconnecting said another voltage source from said integrator input when said zero voltage detector detects a zero voltage output from said integrator and for thereat reconnecting said integrator input to said tracing arm potentiometer output.

27. A computer as defined in claim 25 wherein said chart advancing means includes a rotatable chart supporting turntable.

28. A computer as defined in claim 7 wherein said another voltage source is a predetermined constant potential source.

29. A computer as defined in claim 28 wherein said readout means for connecting said another voltage source to said trace variable integrator input includes means connected to be responsive to the output of said zero voltage detector for disconnecting said predetermined constant voltage source from said trace variable integrator input when said zero voltage detector detects a zero voltage output from said trace variable integrator and for thereat reconnecting said trace variable integrator input to said tracing arm potentiometer output.

30. A computer as defined in claim 28 wherein said for producing an output voltage on said trace variable integrator directly proportional to the integral of the value of the chart trace variable as traced by said tracing arm for the period traced and subsequently further selectively connecting to and impressing on said trace variable integrator input a readout voltage source selected from said other voltage source and the output of said time integrator in a polarity relationship tending to discharge said trace variable integrator, a three-input AND gate, means including a clock means connected for impressing periodic pulses on one of said AND gate inputs tending to make said gate conductive, and an AND gate coincidence input potential source, said readout means including means for connecting and impressing said coincidence input potential source on a second input of said AND gate when said readout means is operated to impress said readout voltage source on the input of said trace variable integrator, a zero voltage detector, means for connecting the output of said trace variable integrator as an input to said zero voltage detector in a manner to provide a change in the output voltage of said zero detector when the output of said trace variable integrator goes to zero, means for connecting and impressing the output of said zero voltage detector on the third input of said AND gate whereby said gate provides for passage of said clock pulses until said zero voltage detector detects a zero output voltage from said trace variable integrator by a complete discharge thereof by said readout voltage whereat said zero detector output changes polarity and closes said gate, means for counting said pulses passed by said gate and providing a resultant measurement indicative of the value represented by the chart trace variable as traced by said tracing arm.

54. A computer defined in claim 53 wherein said electronic computer includes means for connecting and disconnecting said computer to a source of electrical energization and said connecting means has a standby point providing an energizing connection of said computer with said source for clearing said integrators and maintaining them cleared when connected to said standby point.

55. A computer as defined in claim 53 wherein said chart advancing means includues a chart drive with a motive drive source and clutch means for connecting said motive drive source to said chart drive, and means responsive to a predetermined output voltage of said time integrator for declutching said clutch means whereby said chart drive is stopped.

56. A computer as defined in claim 53 wherein said electronic computer includes means for connecting and disconnecting said computer to a source of electrical energization and is provided with means for automatically connecting a clearing means to said integrators when said computer is connected to the energizing source and after a predetermined time for disconnecting said clearing means from said integrator.

57. A computer as defined in claim 56 wherein said connecting and disconnecting means includes a standby point providing an energizing connection of said computer with means for clearing said integrators and maintaining them cleared when connected to said standby point.

58. A computer as defined in claim 53 wherein said chart advancing means includes means responsive to the output voltage of said time integrator for stopping the advance of said chart advancing means when said time integrator output voltage reaches a predetermined value.

59. A computer as defined in claim 58 wherein said means for connecting to and impressing on the input of said time integrator said chart speed responsive generator voltage includes means for selectively impressing predetermined percentages of said chart speed responsive voltage on said time integrator input whereby said predetermined output voltage at which said chart advancing means is stopped will be reached after substantially corresponding percentages of chart rotation have occurred.

60. A computer as defined in claim 53 wherein said chart advancing means includes means for starting and stopping the operation thereof.

61. A computer as defined in claim 60 wherein said starting and stopping means includes means for automatically connecting a clearing voltage means on the input of said integrators for restoring the integrators output to zero and thereafter automatically disconnecting said voltage clearing means from said integrator input.

62. A computer as defined in claim 53 wherein each of said electronic integrators is of the high gain direct current amplifier type.

63. A computer as defined in claim 62 wherein means is provided for adjusting the zero value position of said tracing arm potentiometer for providing an output voltage thereto having a zero reference value corresponding to the relative zero value position of said tracing arm for the chart being traced thereby.

64. A computer as defined in claim 63 wherein means is provided for clearing said integrators.

65. A computer as defined in claim 64 wherein said integrator clearing means is automatically operable to clear said integrators on operation of said readout means to connect said tracing arm potentiometer to the input of said trace variable integrator and is automatically operable to be disconnected from said integrators after a predetermined time.

66. An electronic analog chart trace computer comprising a chart advancing means, means including a generator connected for operation in accordance with the speed of said chart advancing means for generating a voltage in accordance with said speed, a tracing arm operable for following a trace variable on a chart on said chart advancing means, a tracing arm potentiometer assembly connected to and operable by said tracing arm for providing a potentiometer output voltage corresponding in value to the trace variable value in accordance with the displacement of said tracing arm, means for connecting said generator to said tracing arm potentiometer such that the voltage from said generator is modified as the output voltage of said potentiometer in accordance with said trace variable value, an electronic time integrator, means for connecting to and impressing on the input of said time integrator said chart speed responsive generator voltage, an electronic trace variable integrator, a readout means operable for selectively connecting to and impressing on the input of said trace variable integrator said tracing arm potentiometer output voltage for producing an output voltage on said trace variable integrator directly proportional to the integral of the value of the chart trace variable as traced by said tracing arm for the period traced and alternatively subsequently connecting to and impressing on said trace variable integrator input the output of said time integrator in a polarity relationship tending to discharge said trace variable integrator, a three-input AND gate, means including a clock means connected for impressing periodic pulses on one of said AND gate inputs in a sense tending to make said gate conductive, an AND gate coincidence input potential source, said readout means including means for connecting and impressing said coincidence input potential source on a second input of said AND gate in a sense tending to make said gate conductive when said readout means is operated to impress said readout voltage source on the input of said trace variable integrator, a zero voltage detector, means for connecting the output of said trace variable integrator as an input to said zero voltage detector in a sense to provide a change in the sense of the output voltage of said zero detector when the output of said trace variable integrator goes to zero, means for connecting and impressing the output of said zero voltage detector on the third input of said AND gate whereby said gate provides for passage of said clock pulses until said zero voltage detector detects a zero output voltage from said trace variable integrator by a complete discharge thereof by said readout voltage whereat said zero detector output changes polarity and closes said gate, readout means includes means automatically operable for clearing said trace variable integrator on operation of said readout means to connect said trace variable integrator input to said tracing arm potentiometer output.

31. A computer as defined in claim 28 wherein said electronic integrator is of the high gain direct current amplifier type.

32. A computer as defined in claim 28 wherein said tracing arm potentiometer assembly is constructed and is operable by said tracing arm for providing an output voltage therefrom in accordance with the square root value represented by the displacement of said tracing arm.

33. A computer as defined in claim 28 wherein said readout means for connecting said another voltage source to said trace variable integrator input includes means connected to be responsive to the output of said zero voltage detector for disconnecting said another voltage source from said integrator input when said zero voltage detector detects a zero voltage output from said integrator and for thereat reconnecting said integrator input to said tracing arm potentiometer output.

34. A computer as defined in claim 28 wherein means are provided for adjusting the zero value position of said tracing arm potentiometer for providing an output voltage thereto having a zero reference value corresponding to a zero value position of said tracing arm for the zero of the chart being traced thereby.

35. A computer as defined in claim 34 wherein said tracing arm potentiometer assembly is constructed and is operable by said tracing arm for providing an output voltage therefrom in accordance with the square root value represented by the displacement of said tracing arm.

36. A computer as defined in claim 7 wherein said another voltage source comprises means responsive to the advance of said chart advancing means for providing a voltage proportional to said advance as the said another voltage.

37. A computer as defined in claim 36 wherein said means responsive to the advance of said chart advancing means comprises a time abscissa potentiometer the output voltage of which is directly variable in accordance with said advance and provides said another source voltage.

38. A computer as defined in claim 36 wherein said tracing arm potentiometer assembly is constructed and is operable by said tracing arm for providing an output voltage therefrom in accordance with the square root value represented by the displacement of said tracing arm.

39. A computer as defined in claim 36 wherein means is provided for adjusting the zero value position of said tracing arm potentiometer for providing an output voltage thereto having a zero reference value corresponding to a zero value position of said tracing arm for the chart being traced thereby.

40. A computer as defined in claim 36 wherein said chart advancing means includes means for stopping advance of a chart when said time integrator provides a predetermined voltage on its output indicative of a predetermined chart advance.

41. A computer as defined in claim 36 wherein said tracing arm potentiometer assembly is constructed and is operable by said tracing arm for producing an output voltage therefrom linearly in accordance with the relative position of said tracing arm.

42. A computer as defined in claim 41 wherein said readout means for connecting said another voltage source to said trace variable integrator input includes means connected to be responsive to the output of said zero voltage detector for disconnecting said another voltage source from said integrator input when said zero voltage detector detects a zero voltage output from said integrator and for thereat reconnecting said integrator input to said tracing arm potentiometer output.

43. A computer as defined in claim 36 wherein said means responsive to the advance of said chart advancing means comprises an electronic time integrator having means for connecting and impressing said chart responsive generator voltage on the input of said time integrator and the output thereof providing said another source voltage.

44. A computer as defined in claim 43 wherein means is provided for clearing said integrators.

45. A computer as defined in claim 44 wherein said integrator clearing means is automatically operable to clear said integrators on operation of said readout means to connect said tracing arm potentiometer to the input of said trace variable integrator.

46. A computer as defined in claim 43 wherein each of said electronic integrators is of the high gain direct current amplifier type.

47. A computer as defined in claim 46 wherein means is provided for adjusting the zero value position of said tracing arm potentiometer for providing an output voltage thereto having a zero reference value corresponding to a zero value position of said tracing arm for the chart being traced thereby.

48. A computer as defined in claim 46 wherein said readout means for connecting said another voltage source to said trace variable integrator input includes means connected to be responsive to the output of said zero voltage detector for disconnecting said another voltage source from said trace variable integrator input when said zero voltage detector detects a zero voltage output from said trace variable integrator and for thereat reconnecting said trace variable integrator input to said tracing arm potentiometer output.

49. A computer as defined in claim 46 wherein said tracing arm potentiometer assembly is constructed and is operable by said tracing arm for producing an output voltage therefrom linearly in accordance with the relative position of said tracing arm.

50. A computer as defined in claim 43 wherein said readout means for connecting said another voltage source to the input of said trace variable integrator includes means for selectively so connecting a predetermined constant voltage direct current source and the output of said time integrator.

51. A computer as defined in claim 50 wherein said tracing arm potentiometer includes means for selectively connecting said potentiometer to said generator for providing a zero to full scale output voltage from either end of said potentiometer.

52. A computer as defined in claim 51 wherein said selective connecting means provides for a zero to full scale potentiometer output voltage for either a clockwise or counterclockwise turning of said tracing arm.

53. An electronic analog chart trace computer comprising a chart advancing means, means including a generator connected for operation in accordance with the speed of said chart advancing means for generating a voltage in accordance with said speed, a tracing arm operable for following a trace variable on a chart on said chart advancing means, a tracing arm potentiometer assembly connected to and operable by said tracing arm for providing a potentiometer output voltage corresponding in value to the trace variable value in accordance with the displacement of said tracing arm, means for connecting said generator to said tracing arm potentiometer such that the voltage from said generator is modified as the output voltage of said potentiometer in accordance with said trace variable value, an electronic time integrator, means for connecting to and impressing on the input of said time integrator said chart speed responsive generator voltage, an electronic trace variable integrator, a constant direct current other voltage source, a readout means operable for selectively connecting to and impressing on the input of said trace variable integrator said tracing arm potentiometer output voltage means for counting said pulses passed by said gate and providing a resultant measurement indicative of the average value represented by the chart trace variable as traced by said tracing arm.

67. A computer as defined in claim 66 wherein said chart advancing means includes a chart drive with a motive drive source and clutch means for connecting said motive drive source to said chart drive, and means responsive to a predetermined output voltage of said time integrator for declutching said clutch means whereby said chart drive is stopped.

68. An electronic analog chart trace computer comprising a chart-advancing means, means including a generator connected for operation in accordance with the speed of said chart-advancing means for generating a voltage responsive to said speed, a tracing arm operable for following a trace variable on a chart on said chart-advancing means, a tracing arm potentiometer assembly connected to and operable by said tracing arm for providing a potentiometer output voltage corresponding in value to the trace variable value responsive to the displacement of said tracing arm, means for connecting said generator to said tracing-arm potentiometer such that the voltage from said generator is modified as the output voltage of said potentiometer in accordance with said trace variable value, an electronic time integrator, means for connecting to and impressing on the input of said time integrator said chart speed responsive generator voltage, an electronic trace variable integrator, another voltage source, means for selectively connecting said another voltage source and the output of said time integrator to provide a readout voltage source, a readout means operable for selectively connecting to and impressing on the input of said trace variable integrator said tracing arm potentiometer output voltage for producing an output voltage on said trace variable integrator directly proportional to the integral of the value of the chart trace variable as traced by said tracing arm for the period traced and alternatively subsequently connecting to and impressing on said trace variable integrator input said readout voltage source in a polarity relationship tending to discharge said trace variable integrator, a three input AND gate, means including a clock means connected for impressing periodic pulses on one of said AND gate inputs, an AND gate coincidence input potential source, said readout means including means for connecting and impressing said coincidence input potential source on a second input of said AND gate when said readout means is operated to impress said readout voltage source on the input of said trace variable integrator, a zero voltage detector, means for connecting the output of said trace variable integrator as an input to said zero voltage detector, means for connecting and impressing the output of said zero voltage detector on the third input of said AND gate whereby said gate provides for passage of said clock pulses until said zero voltage detector detects a zero output voltage from said trace variable integrator by a complete discharge thereof by said readout voltage whereat said zero detector output changes polarity and closes said gate, means for counting said pulses passed by said gate and providing a resultant visual measurement indicative of the value represented by the chart trace variable.

69. An electronic analog chart trace computer comprising a chart advancing means, means including a generator operable at a speed proportional to the speed of said chart advancing means for generating a voltage in accordance with said speed, a tracing arm means for following a trace variable on a chart on said chart advancing means and providing an output voltage corresponding in value to the trace variable in accordance with the position of said tracing arm, means connecting said generator to said tracing arm means whereby the voltage from said generator is modified as the output voltage of said means in accordance with said trace variable value, means for measuring the advance of a chart by said chart advancing means and providing a chart advance voltage in accordance therewith, an electronic trace variable integrator, a read-out means operable for selectively impressing on the input of said trace variable integrator said tracing arm means output voltage for producing an output voltage on said trace variable integrator directly proportional to the integral of the chart trace variable as traced by said tracing arm for the period traced and alternatively subsequently impressing on said trace variable integrator input said chart advance voltage in a polarity tending to discharge said integrator, a plural input AND gate, means including a clock means for impressing periodic pulses on one of said AND gate inputs, means for impressing a coincidence input potential on a second input of said AND gate when said chart advance voltage is impressed on the input of said trace variable integrator, means for rendering said AND gate conductive responsive to the output of said trace variable integrator whereby said gate provides for passage of said clock pulses until said trace variable integrator output voltage is reduced to zero by a complete discharge thereof by said chart advance voltage whereat said gate is rendered nonconductive, means connected to the output of said gate for counting said pulses passed by said gate and providing a resultant measurement indicative of the average value represented by the chart trace variable for the period traced.

References Cited

UNITED STATES PATENTS

| | | | |
|---|---|---|---|
| 2,978,636 | 4/1961 | Fountain | 235—183 |
| 3,051,898 | 8/1962 | Eynon | 346—13 |
| 3,168,655 | 2/1965 | Vadus | 235—183 |
| 3,185,925 | 5/1965 | Grass | 346—13 |

OTHER REFERENCES

"The Review of Scientific Instruments," August 1954; vol. 25, number 8.

EUGENE G. BOTZ, Primary Examiner

EDWARD J. WISE, Assistant Examiner

U.S. Cl. X.R.

346—7, 13; 235—183